US012766404B2

(12) United States Patent
Chi et al.

(10) Patent No.: US 12,766,404 B2
(45) Date of Patent: Oct. 20, 2026

(54) INTELLIGENT GAMING ASSISTANT FOR RELATIONSHIP IDENTIFICATION IN A DYNAMIC GAMING ENVIRONMENT

(71) Applicant: Dell Products L.P., Round Rock, TX (US)

(72) Inventors: Wei-Hsiang Chi, Taipei (TW); Preeth Kartikeyan Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/355,207

(22) Filed: Jul. 19, 2023

(65) Prior Publication Data

US 2025/0025777 A1 Jan. 23, 2025

(51) Int. Cl.
*A63F 13/327* (2014.01)
*A63F 13/79* (2014.01)

(52) U.S. Cl.
CPC ............ *A63F 13/327* (2014.09); *A63F 13/79* (2014.09)

(58) Field of Classification Search
CPC ........ A63F 13/327; A63F 13/79; A63F 13/67; A63F 13/798
See application file for complete search history.

(56) References Cited

U.S. PATENT DOCUMENTS

2008/0148165 A1* 6/2008 Zalewski .............. A63F 13/211 715/764
2019/0209925 A1* 7/2019 Benedetto ............. A63F 13/215
2019/0232168 A1* 8/2019 Benedetto ............... A63F 13/67
2019/0329139 A1* 10/2019 Di Giacomo Toledo .................... A63F 13/67
2021/0056603 A1* 2/2021 Vidal ...................... A63F 13/87
2023/0381652 A1* 11/2023 Rudi ..................... A63F 13/847

OTHER PUBLICATIONS

Tyler Colp, Gamer of the Year 2022: Let Me Solo Her, Dec. 21, 2022, PC Gamer. (Year: 2022).*

* cited by examiner

*Primary Examiner* — David Tung
(74) *Attorney, Agent, or Firm* — Norton Rose Fulbright US LLP

(57) ABSTRACT

This disclosure is generally related to identifying relationships between users of a gaming hub device within a household and through those relationships identifying users that can provide assistance. For example, a method may include receiving, by a hub device from a first user device, first telemetry data associated with a first user during a first user session of a gaming application; receiving, by the hub device from a second user device, second telemetry data associated with a second user during a second user session of the gaming application; generating a recommendation for a gaming interaction between the first user and the second user based on a comparison of the first telemetry data and the second telemetry data; and transmitting the recommendation to a display device associated with at least one of the first user device or the second user device. Other aspects are also disclosed.

20 Claims, 12 Drawing Sheets

800B

| Gaming Performance | Wellness Data | Session Data | User Rating |
|---|---|---|---|
| NA | NA | Insufficient play time | Not rated |
| NA | Extreme heart-rate or indoor motion | NA | Not rated |
| Great | Normal excitement | Cadence in the game/stage | Can offer help |
| Repeatedly poor | Normal excitement | Show continued interest | May need help |
| Good | Normal excitement | Sufficient time in the game/stage | Enjoying |

820B

FIG. 8B

900

| | User Ratings | Relationship | Gaming context | Grouping recommendation |
|---|---|---|---|---|
| 910 | 3 or more members like the same game<br>>=3 of ( Enjoying or Can offer help ) | At least 1 circumstance where multiple members played together | A popular multi user game | AI sends invitation to all family members of the same game in a frequently playing time of a week<br>Promotion of similar games possible (facilitate family get-together) |
| 920 | User1 recently achieved<br>1x Can offer help | User1 has gaming buddies in the family<br>(may or may not play the same game before) | Any single or multi user game | AI Informs other gaming buddies on this recent achievement<br>(sharing the happiness) |
| 930 | User1 recently achieved<br>1x Enjoying | Other gamers available in the family<br>(may or may not play together) | A popular multi user game | [Team family]<br>AI recommends all gamers in the family to play together<br>(facilitate family get-together) |
| 940 | Kiddo/Sister recently encountered<br>1x May need help | at least one parent is registered as gamer | Any | AI informs the parent(s) and suggest relevant resource for potential help<br>(improve the learning curve) |
| 950 | User1 help needed identified<br>May need help<br>User2 helper identified<br>Can offer help | The two members play together sometimes | Any | AI informs user1 the potential helps available from user2<br>(improve the learning curve) |

FIG. 9

1000

| Scenario | Session data | Relationship data | Game context | AI engine | Family relationship assistance |
|---|---|---|---|---|---|
| [Family helps] Sister failed in the same challenge for 3 times in a roll | Normal playing time | Daddy and Sister play together sometimes [WHO] | Daddy passed the challenge last week | Automatically searching for tips from discussion forums, youtube, etc., and prioritized by AI | Hint the user "Do you know that Daddy has passed this challenge on [Date] ?"<br>"More hint available [link to more resource]" |
| [Family time] | Kiddo and Sister sometimes game on Sat. morning [WHEN] | Kiddo won over Daddy in a car racing game last month | It's one of the popular racing game | Other popular racing maps available in the same game | AI sends invitation to all family membe for a racing challenge next Sat. morning, and list out 3 recommended maps based on prior intelligence |
| [Family challenge] Kiddo passed a difficult level | Normal Playing time | Daddy and Kiddo haven't played together this week | It's a single user game | Daddy failed the same level last week and set it as a family challenge | Inform Daddy about Kiddo's achievement<br>Ask Kiddo: do you want to pass the challenge to Sister (Yes/No)? |
| [Team family] | Daddy plays at school hours with random online partner | The family seldom play together | Multi-user game | AI identified the same game is good for family | Suggest Daddy: do you know the game has been played across family members? (sample family picture pops up)<br>Suggest few time slots based on prior intelligence |
| [Family cares] | Family playing in the weekend<br>Kiddo has abnormal heart rate | Kiddo lost 3 times in a roll | Shooting game | Time to stay away from family competition | Recommend a collaborative game |

FIG. 10

INTELLIGENT GAMING ASSISTANT FOR RELATIONSHIP IDENTIFICATION IN A DYNAMIC GAMING ENVIRONMENT

FIELD OF THE DISCLOSURE

The instant disclosure relates to information handling systems. More specifically, portions of this disclosure relate to an information handling system for facilitating gaming interactions between users of video game applications (or gamers).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One increasingly popular use for information handling systems is gaming. Information handling systems can be utilized by users to execute a variety of gaming applications, such as strategy games, adventure games, first person shooter games, racing games, sports games, simulation games, role playing games, platformer games and other games. Gaming applications may range in difficulty from easy to learn by a non-gamer to difficult even for veteran gamers.

Oftentimes, when a user (or gamer) encounters a particularly difficult segment of a game or wishes to improve their skills, the user may consult online resources (such as online videos, written strategy guides, forums, message boards, and other information sources) for tips, strategies, and other assistance related to improving their skills with respect to a particular game. Such gaming resources, however, may be unavailable at times or may provide information that is not tailored to the user's specific experience level, gaming style, personality, or interests. Furthermore, users often play games by themselves, in isolation from their friends and family. As such, a gamer may be unaware of potential gaming resources local to the gamer (such as family members or roommates who are also gamers) with whom they already have a social connection and share common interests (such as playing the same games).

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Information handling systems may be used to execute applications, such as gaming applications. Embodiments of this disclosure may be used to provide an information handling system, such as a hub device, to facilitate social connections (such as household relationships) between different users of a gaming application (such as different gamers who are also family members or roommates living in the same household). As user experience applications (such as gaming applications), and user experiences associated with such applications, become more social, a user may interact with one or more other users during an application session of the gaming application. To illustrate, the application session may be a gaming session in which the user plays a multiplayer game with other users in one or more of the user's social groups (e.g., members of the user's family). It is noted that a portion (or entirety) of an application or gaming session that a device associated with a user is accessing may be referred to as a user session that is associated with the user. During a user session in which the user interacts with the one or more other users, the information handling system may receive information associated with the user session of each user. Information provided about another user may vary between user experience applications (e.g., games). Some information that is available or able to be determined for or about another user during the user session of the user include a name or user ID of the other user, an online status of the other user, a user experience application being consumed by the other user. Additional telemetry data collected from respective user devices during gaming sessions (e.g., multi-user sessions of the same gaming application) may be used to correlate different user sessions. The correlated user sessions may be used to identify relationships between different users based on their interactions and improve user experiences based on the identified relationships.

In some embodiments, the information handling system may provide an intelligent gaming assistance service (e.g., an automated gaming assistant) that analyzes the telemetry data acquired over one or more user sessions to infer relationships between different users (such as family members) and provide recommendations for new gaming sessions or gaming interactions between these users to help build or strengthen such relationships. When a user is engaged in a gaming session with other users, parallels in the telemetry data associated with each user session may be identified based on analyzing the data and/or comparing with models. In some embodiments, the gaming assistant of the information handling system may use time-series telemetry to recognize trends in gameplay and identify relevant interactions and/or shared gaming characteristics between different users. The models may incorporate feedback to improve the model and learn the behavior of each user over time to build confidence in identifying such user interactions. Based on the identified interactions, the gaming assistant may determine a potential grouping of different gamers having similar gaming characteristics (such as a particular gaming genre). Based on the grouping, the gaming assistant may generate a recommendation for a future gaming interaction or gaming session to facilitate social connections or relationships between the gamers. For example, the gaming assistant may identify a collaborative gameplay opportunity (such as a family game night) based on the identified interactions and provide a grouping recommendation for a gaming session between particular gamers to play a particular game at a particular time.

As will be described in further detail below, the telemetry data analyzed by the gamer assistant to generate such gaming recommendations may include a mix of available session data, wellness data, and relationship data collected for each user during one or more gaming sessions of a gaming application. The session data may include information relating to one or more gaming characteristics of a user (such as the user's age, gender, level of skill or experience in a particular gaming application or particular stage thereof, and various gaming preferences or other gaming attributes). The session data may be provided by the gaming application or captured by the information handling system during one or more user sessions. The wellness data may include various measurements collected by different sensors or measurement devices that are coupled to or integrated with a peripheral device, such as a game controller, of the user during each user session. Such sensors may include, for example, one or more motion sensors (e.g., one or more of a gyroscope and an accelerometer), a heart rate sensor, a temperature sensor, a moisture sensor, a microphone, a fingerprint sensor (for user identification), and one or more location sensors or devices. The wellness data may indicate one or more physiological characteristics of the user, such as the user's level of stress or excitement during the user session. The relationship data may include information relating to interactions between different users during one or more gaming sessions, which may be used to determine a relationship between the users. In some implementations, the relationship data may be derived from other telemetry data (such as session data associated with one or more user sessions).

In some embodiments, the aspects described herein may be used to support the execution of gaming applications in different environments. The gaming applications may include any of various single-player or multi-player games, such as puzzle games, role playing games, adventure games, first person shooter games, sports games, simulation games, strategy games, platformer games, and other games. Such games may be hosted by the information handling system to support different types of gameplay in one or more gaming environments, such as one or more rooms of a household for gameplay in a family environment or a cloud-based gaming environment for online gameplay. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables gameplay from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, includes receiving, by a hub device from a first user device, first telemetry data associated with a first user during a first user session of a gaming application; receiving, by the hub device from a second user device, second telemetry data associated with a second user during a second user session of the gaming application; generating a recommendation for a gaming interaction between the first user and the second user based on a comparison of the first telemetry data and the second telemetry data; and transmitting the recommendation to a display device associated with at least one of the first user device or the second user device.

The method may be embedded in a computer-readable medium as computer program code comprising instructions that cause at least one processor to perform operations corresponding to the steps of the method. In some embodiments, the at least one processor may be part of an information handling system including a first network adaptor configured to transmit data over a first network connection; the at least one processor coupled to the first network adaptor.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 8B is a table illustrating different input scenarios for assigning different user ratings using the rating scheme of FIG. 8A according to some embodiments of the disclosure.

FIG. 9 is a table with examples of different scenarios for providing grouping recommendations to one or more users of a gaming application based on user ratings and a gaming context associated with the gaming application according to some embodiments of the disclosure.

FIG. 10 is another table with examples of different scenarios for providing gaming assistance to promote or facilitate family relationships according to some embodiments of the disclosure.

DETAILED DESCRIPTION

Figure 1:
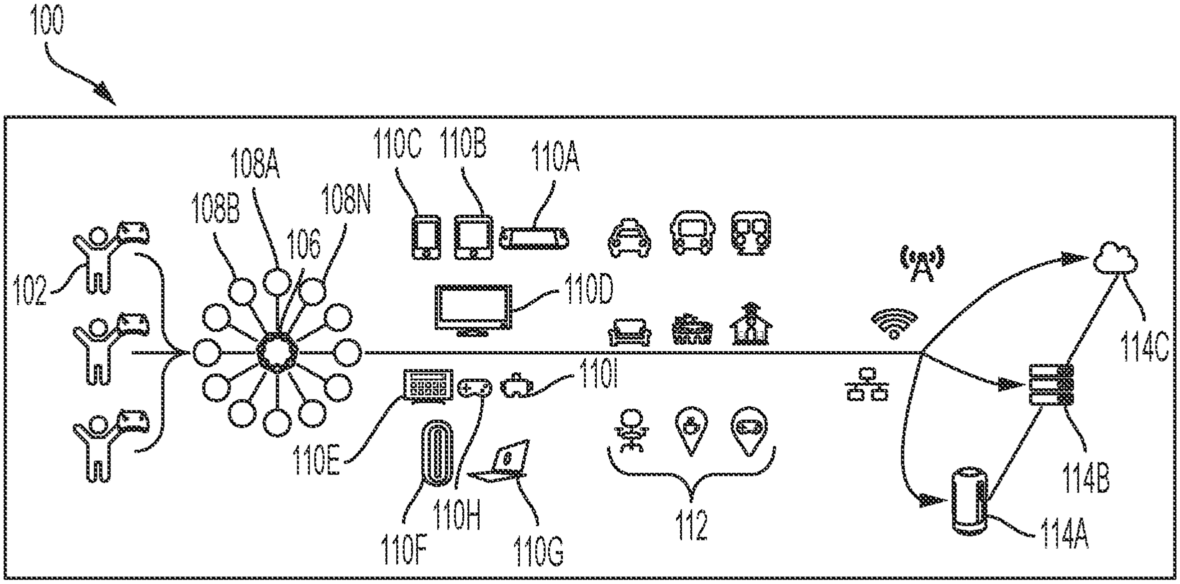
FIG. 1 is a block diagram illustrating aspects of a configurable system for providing various services to users according to some embodiments of the disclosure.

These example embodiments describe and illustrate various aspects of a configurable and dynamic gaming environment that can be supported through the use of a hub device, which may be an information handling system. This dynamic gaming environment may collect data and perform analysis to determine relationships and provide assistance to users interacting with gaming applications executing on the hub device. The information collection and/or analysis may be performed on the hub device and/or a cloud server in communication with the hub device.

A hub device may be located in a user's home and used to arrange gameplay (or gaming) sessions (or more generally, application sessions) between host devices and services. The host devices may execute an application for receiving an AV stream for displaying rendered content from a gameplay session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different gaming environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize the application session for the peripheral device between the television as a consumption device and the hub device as a service. The service on the hub device executes the game and streams rendered content to an application executing on the television consumption device. As noted above, a portion (or entirety) of an application session for a gaming application accessed by a device associated with a user may be referred to as a user session.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system or hub device may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, handheld gaming system, console gaming system, hybrid gaming system, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

In some implementations, an application session, such as a gaming session of a gaming application, may execute on a service, either locally on a device, on another system on a network, or in the cloud. A device, such as one of devices 110A-I, may access the application session by executing an application that communicates with the service to receive and transmit user input to the service and provide feedback to the user from the service. The device may include its own audio/visual (AV) output for displaying a graphical user interface and/or a rendered display from the application session. Different environments at a location may include different AV systems, and the device may be automatically paired with an AV system and may be reconfigured to support interaction with an application session using the paired AV system.

Figure 2:
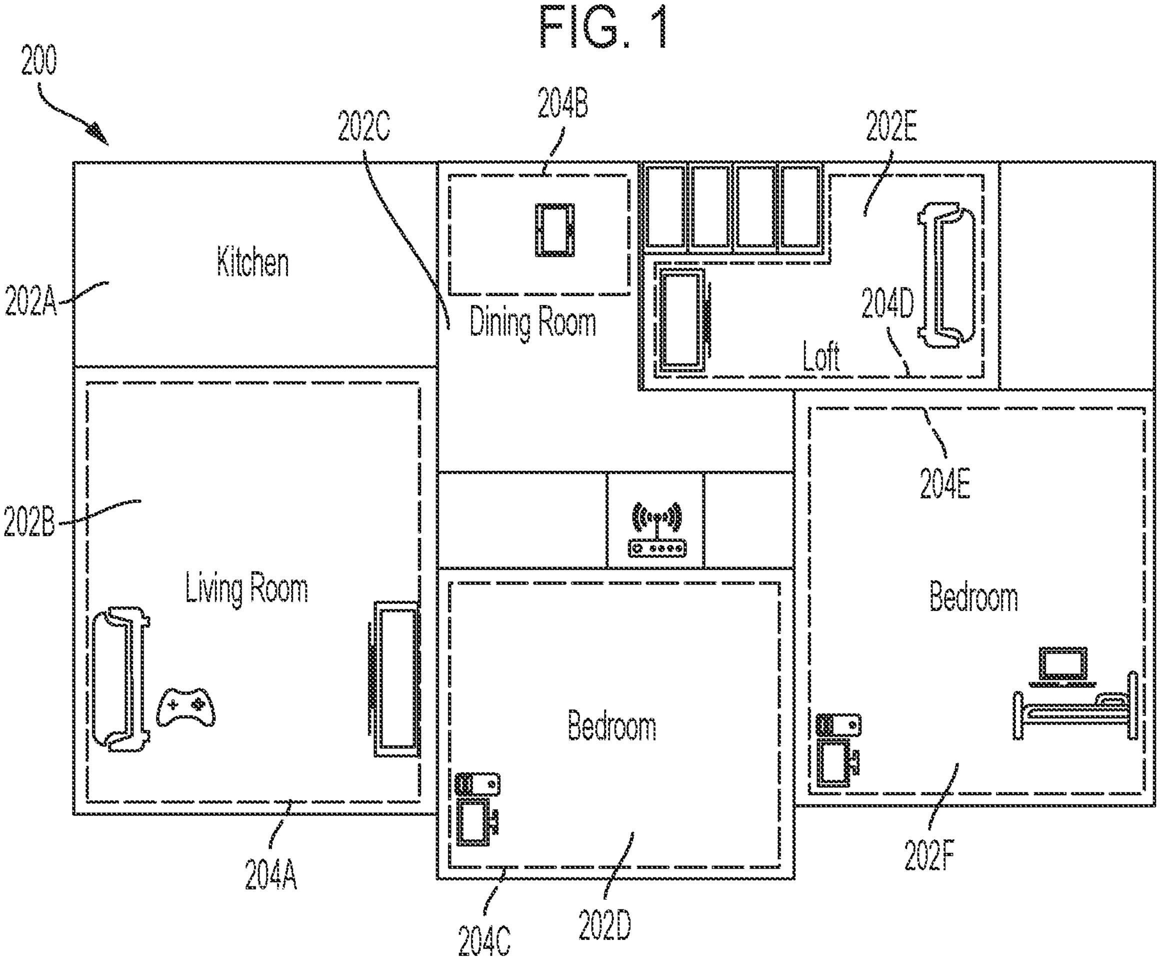
FIG. 2 is a block diagram illustrating possible gaming environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session (e.g., a user session associated with each user). In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
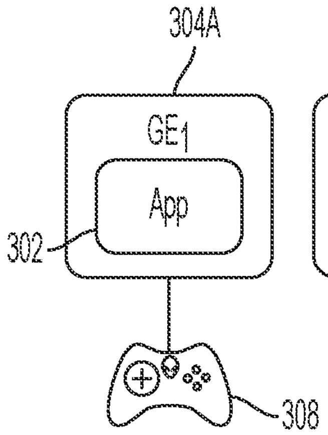
FIG. 3A is a block diagram illustrating an arrangement of applications and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session, such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
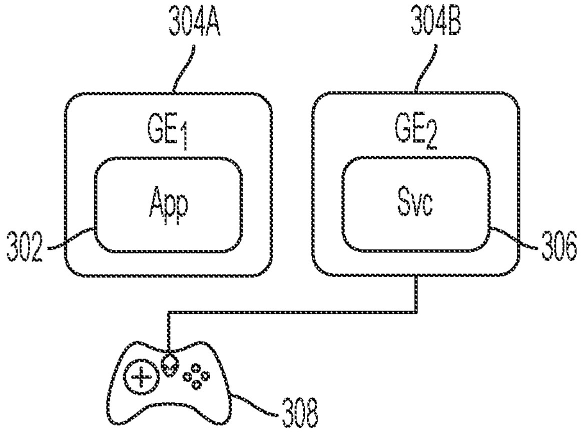
FIG. 3B is a block diagram illustrating another arrangement of applications and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
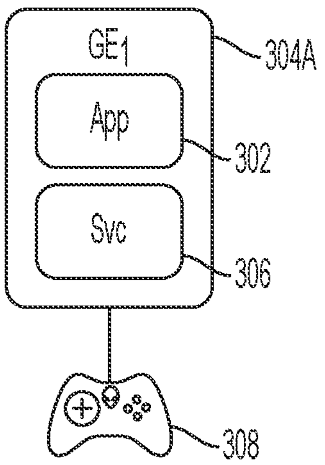
FIG. 3C is a block diagram illustrating an arrangement of applications and services hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
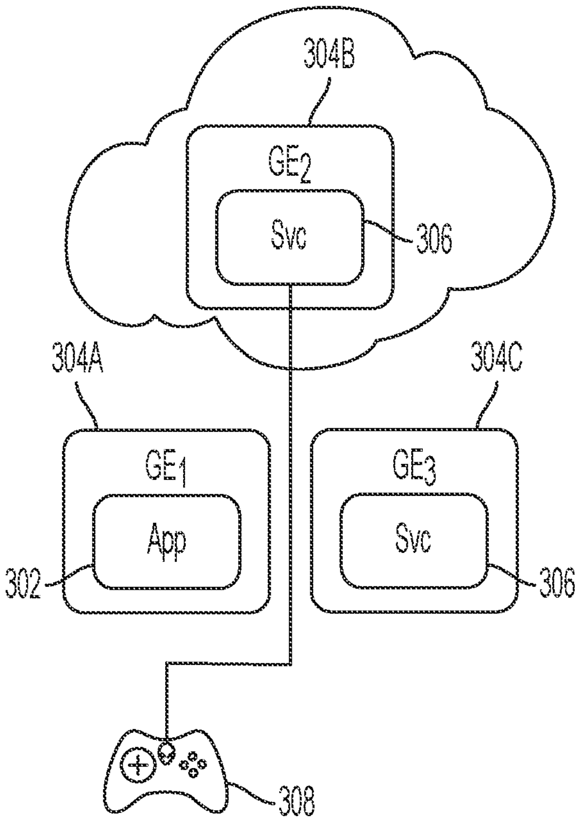
FIG. 3D is a block diagram illustrating a cloud-based service arrangement of a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, even though the user's home includes a gaming environment 304C in which the service 306 may be executed, when the user is engaging with the application 302 at a location on a different network from their home (e.g., at a friend's house). The service 306 may also or alternatively be executed, for example, on a cloud computing device available as a subscription service to the user.

In some embodiments, the service 306 may be used to infer relationships or social connections between different users (or "gamers") in one or more of the gaming environments 304A-C of FIGS. 3A-3D described above. Such relationships may be based on an analysis of telemetry information acquired from various sources for each user during a corresponding user session of the application 302 (e.g., a gaming application). As described above, such information may include a combination of session data, wellness data, and relationship data. The session data may include information relating to one or more gaming characteristics of a user (such as the user's age, gender, level of skill or experience in a particular gaming application or particular stage thereof, and various gaming preferences or other gaming attributes). The session data may be provided by the gaming application or captured by the information handling system during one or more user sessions. The wellness data may include various wellness or biometric measurements (such as the user's heart rate, temperature, hand moisture levels, motion, etc.) collected by different sensors or measurement devices that are coupled to or integrated with a peripheral device, such as the controller 308, associated with the user during each user session. The relationship data may include information relating to interactions between different users during one or more gaming sessions, which may be used to determine a relationship between the users. In some implementations, the relationship data may be derived from other telemetry data (such as session data associated with one or more user sessions).

In some embodiments, telemetry data along with a gaming context associated with the application 302 may be analyzed by the service 306 to infer relationships between different users (such as family members) and provide recommendations for new gaming sessions or interactions to help build or strengthen such relationships. The service 306 may then transmit the recommendation to one or more users devices. Additional details regarding such a gaming assistance service (or gaming assistant) will be described with reference to the examples in FIGS. 4-10.

Figure 4:
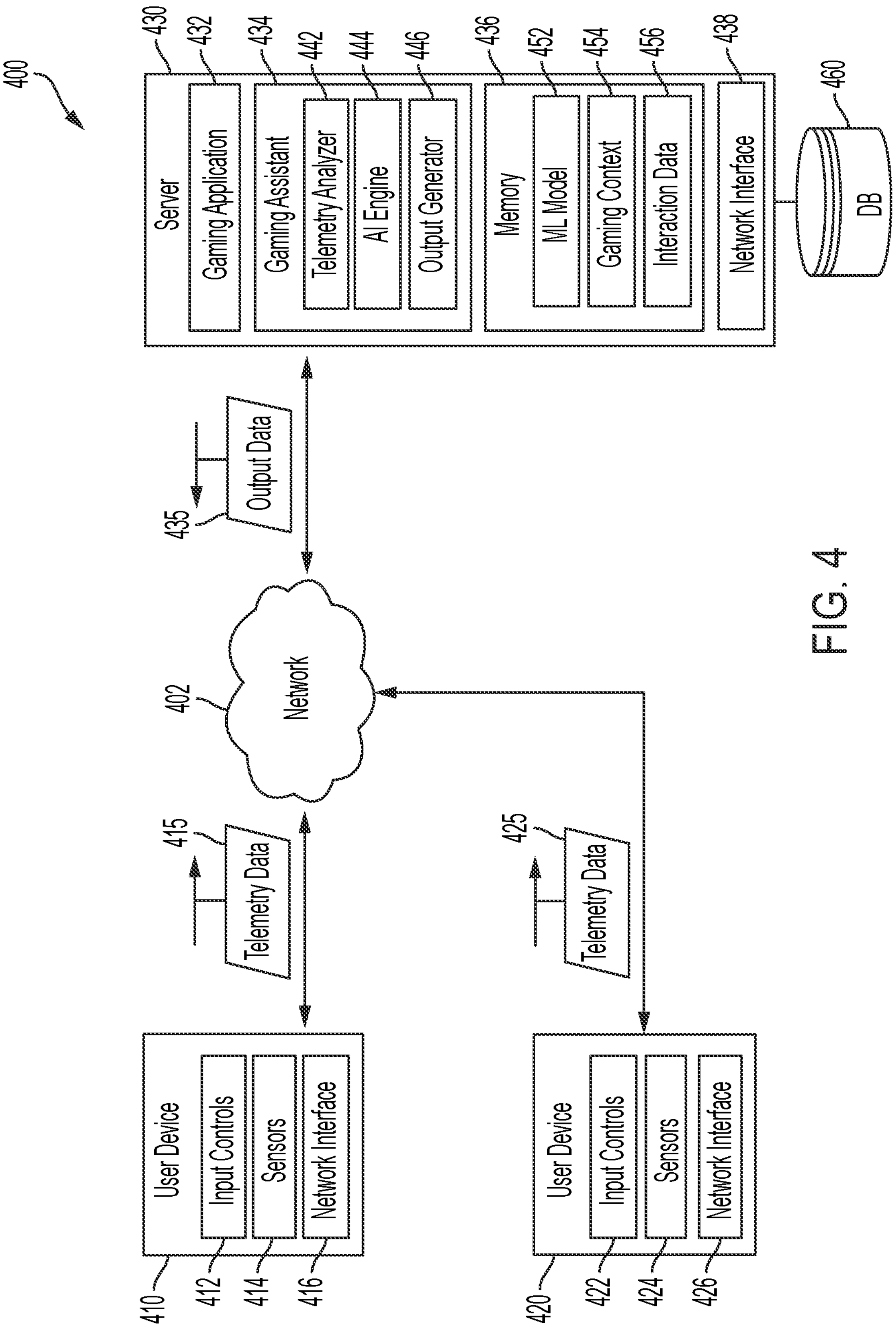
FIG. 4 is a block diagram illustrating an example of a system for providing recommendations to promote or facilitate gaming interactions between users of a gaming application according to some embodiments of the present disclosure.

FIG. 4 is a block diagram illustrating a system 400 for providing recommendations to promote or facilitate gaming interactions between users of a gaming application according to some embodiments of the present disclosure. System 400 may include or correspond to one or more devices in system 100 of FIG. 1, as described above. As shown in FIG. 4, system 400 includes a user device 410, a user device 420, and a server 430. Although only user devices 410, 420, and server 430 are shown in FIG. 4, it should be appreciated that system 400 may include any number of additional user devices and/or servers as desired for a particular implementation. Each of the user devices 410 and 420 may be communicatively coupled to the server 430 via a network 402. The network 402 may include a wired network, a wireless network, or a combination thereof. To illustrate, the network 402 may include a Bluetooth personal area network (PAN), a local area network (LAN), a wireless LAN (WLAN), a wide area network (WAN), a wireless network (e.g., a cellular network), a wired network, the Internet, one or more other networks, or a combination thereof, as illustrative, non-limiting examples. In some implementations, the network 402 may include or correspond to a wired or wireless connection between the server 430 and each of the user devices 410 and 420.

In some embodiments, system 400 may be a gaming system in which the server 430 may include or correspond to an information handling system or hub device, such as a gaming console, a desktop computer, a laptop computer, a tablet, a mobile device, a server (e.g., a cloud server), or other type of computing device for executing games or gaming applications, such as a gaming application 432. The gaming application 432 may include any of various single-player or multi-player games. Examples of such games include, but are not limited to, puzzle games, role playing games, adventure games, first person shooter games, sports games, simulation games, strategy games, platformer games, and other games. The server 430 may be used to host an application session (e.g., a gaming session or user session) for one or more users of the gaming application 432 within one or more gaming environments, such as the gaming environment 304A, the gaming environment 304B, or a combination thereof. In some implementations, the server 430 may operate as a gaming cloud server that provides a cloud-based execution environment for gaming applications, such as the gaming application 432, of the gaming system. As will be described in further detail below, the server 430 may also execute a gaming assistant 434 that operates alongside the gaming application 432 for identifying potential relationships between different users and providing a gaming recommendation to at least one of the users to facilitate social connections or relationships with the other users. The gaming recommendation may be, for example, a recommendation for a new gaming interaction with at least one other user or a grouping recommendation for a new gaming session between the different users.

In some embodiments, the user devices 410 and 420 may be peripheral devices associated with different users of the gaming system. Examples of such a peripheral device include, but are not limited to, a game controller (e.g., a gamepad or a joystick controller), a mouse, a keyboard, a display, a speaker, a microphone, a headset, a virtual reality (VR) device, an augmented reality (AR) device, a vehicle control simulation device (such as a racing wheel or a vehicle pedal assembly), a musical instrument simulation device (such as a guitar controller), a detachable controller, or a brain-computer interface (BCI) device, a streaming device (e.g., for streaming gaming content from the server 430), a handheld gaming device, a smartphone, and a tablet computer. Although the user devices 410 and 420 are illustrated in FIG. 4 as being external to the server 430, it should be appreciated that, in some implementations, one or more of these devices may be included or integrated within the server 430, for example, as part of a handheld gaming system. Also, while not shown in FIG. 4, it should be appreciated that certain output (e.g., video or audio output) generated in response to the user input may be provided to or experienced by the user via an output device (e.g., a display device or an audio speaker) that is coupled to or integrated with the server 430.

Each of the user devices 410 and 420 may include a processor, such as a central processing unit (CPU) or other computing circuitry (e.g., a microcontroller, one or more application specific integrated circuits (ASICs), or the like) and various interfaces for input, output, and network communications with other devices (including the server 430). Each of the user devices 410 and 420 may also include a memory. The memory may include a read only memory (ROM) device, a random access memory (RAM) device, one or more hard disk drives (HDDs), a flash memory device, a solid state drives (SSDs), or any other device or combination of different devices configured to store data in a persistent or non-persistent state. In some implementations, the memory may be used to store one or more instructions, including instructions executable by the processor for a software application. Additionally or alternatively, the memory may be used to store one or more thresholds, data, user preferences, one or more device configurations, parameters, other device settings, or any combination of the foregoing.

In some embodiments, the user device 410 includes input controls 412, sensors 414, and a network interface 416. Likewise, user device 420 includes input controls 422, sensors 424, and a network interface 426. The input controls 412 and 422 of the respective user devices 410 and 420 may correspond to one or more input devices or controls for receiving user input based on a user's physical interaction with the input controls 412 and 422. Such input devices may include, for example, one or more depressible buttons, triggers, thumbsticks, scroll wheels, directional pads, touch-screens, touchpads, microphones, and other types of input controls. The sensors 414 and 424 of the respective user devices 410 and 420 may correspond to various sensors or measurement devices that are coupled to or integrated with each user device for collecting different types of biometric measurements or wellness data associated with a user during one or more user sessions of the gaming application 432. The network interfaces 416 and 426 of the respective user devices 410 and 420 may correspond to one or more communication interfaces for communicating with the server 430 via the network 402. Such communication interfaces may include, but are not limited to, a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or any combination of the foregoing interfaces.

The user devices 410 and 420 may use their respective network interfaces 416 and 426 to transmit information to the server 430 via the network 402 based on user input received via the respective input controls 412 and 422 and/or the measurements collected by the respective sensors 414 and 424. In some embodiments, the information transmitted to the server 430 may include telemetry data 415 from the user device 410 and telemetry data 425 from the user device 420. The network interfaces 416 and 426 of the respective user devices 410 and 420 may also be used to receive output data 435 from the server 430 via the network 402 (e.g., in response to the information transmitted to the server). The output data 435 may include, for example, instructions and/or data transmitted by the server 430 in response to the telemetry data 415 and 425 received from the respective user devices 410 and 420. Based on the received output data 435, each of the user devices 410 and 420 may be configured to generate an output (such as one or more of an audio output, a visual output, a haptic output, or other output) via one or more additional interfaces. It should be appreciated that each of the user devices 410 and 420 may include additional input/output (I/O) interfaces and associated components than those shown in FIG. 4. For example, each of the user devices 410 and 420 may further include an audio interface for audio output via one or more speakers, a display interface for visual output via a display, a lighting interface for light output via one or more light sources (e.g., a light ring), and/or a haptic interface for haptic output or feedback via one or more haptic or vibration devices (e.g., via a haptic touchpad or a rumble motor).

In some implementations, each of the user devices 410 and 420 may be a game controller associated with a different user of the gaming system. As described above, the sensors 414 and 424 of the respective user devices 410 and 420 may correspond to various sensors or measurement devices that are coupled to or integrated with each user device (or game controller) for collecting different types of biometric or wellness data associated with the corresponding user during one or more user sessions of the gaming application 432. An example of a game controller that may be used to implement each of the user devices 410 and 420 is shown in FIGS. 5A and 5B.

Figure 5A:
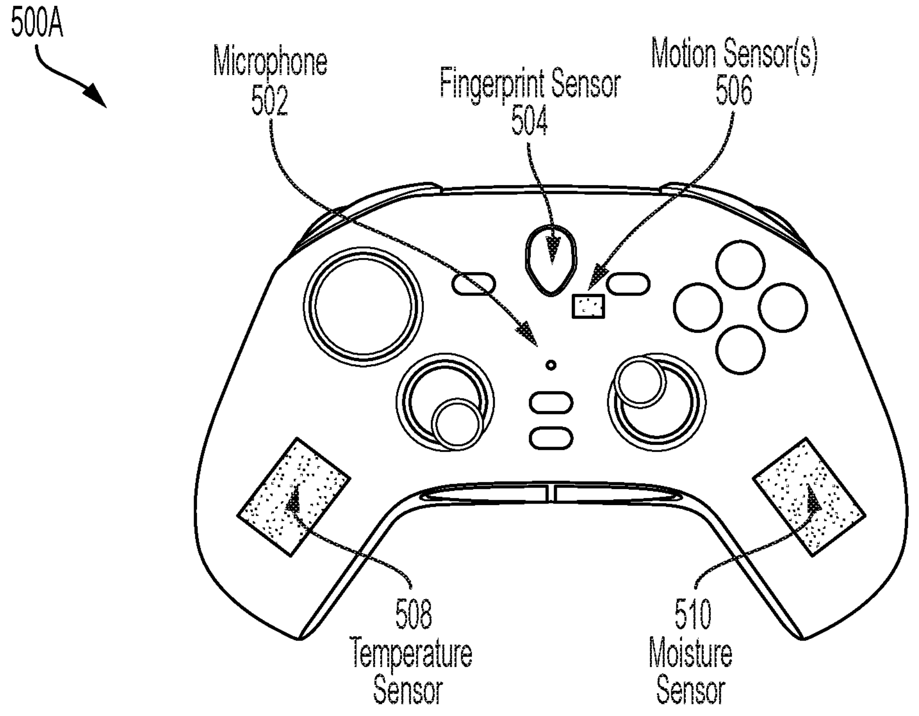
FIG. 5A is a diagram illustrating a view of a game controller including various sensors for collecting wellness data associated with a user during a user session according to some embodiments of the disclosure.
Figure 5B:
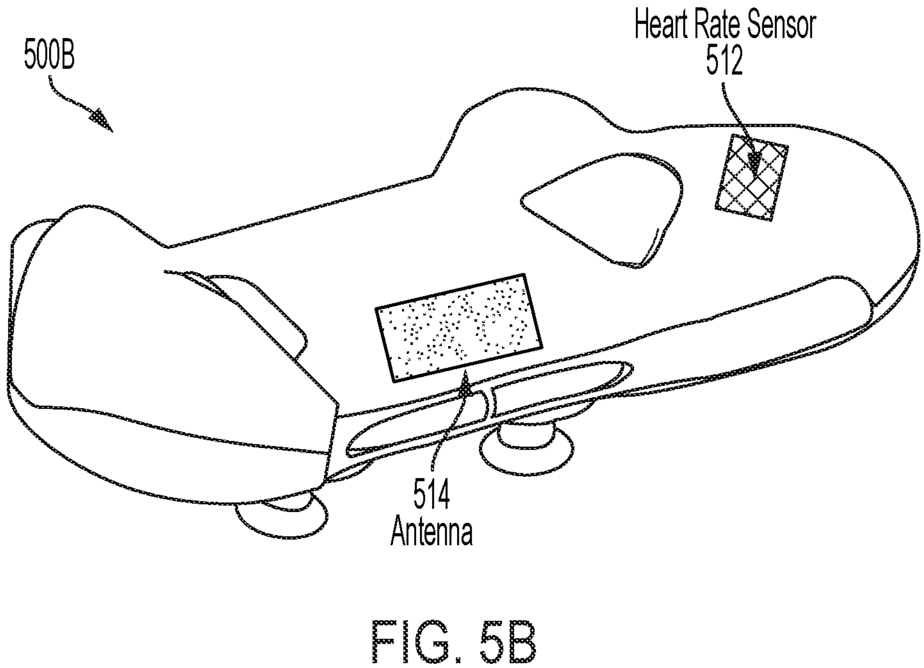
FIG. 5B is a diagram illustrating another view of the game controller of FIG. 5A with additional sensors for collecting additional wellness data associated with the user according to some embodiments of the disclosure.

FIG. 5A is a diagram illustrating a top view 500A of a game controller including various sensors for collecting wellness data associated with a user during a gaming session according to some embodiments of the disclosure. As shown in the example of FIG. 5A, the sensors of the game controller may include, but are not limited to, a microphone 502, a fingerprint sensor 504, one or more motion sensors 506, a temperature sensor 508, and a moisture sensor 510. Each sensor may be strategically placed in a location on the game controller that maximizes some performance or measurement criteria (e.g., based on the type of sensor) while satisfying one or more design constraints. For example, the microphone 502 may be placed in a central location on the game controller that is away from user input devices (e.g., buttons, thumbsticks, touchpads, etc.), and thus, less likely to be obstructed by the user's hands, to maximize a sound reception performance of the microphone 502.

The microphone 502 may be used to capture sounds (e.g., voice data for the user or other users in the user's vicinity) during the gaming session. The fingerprint sensor 504 may be used to scan the user's fingerprint, and the corresponding fingerprint data may be transmitted to an information handling system or hub device (e.g., the server 430 of FIG. 4) for purposes of user identification or account registration. In some implementations, the voice data from the microphone 502 may also be used (e.g., together with the fingerprint data from the fingerprint sensor 504) to identify the user before or during the gaming session. The motion sensor(s) 506 may be used to detect a motion of the user during the gaming session. In some implementations, the motion sensor(s) 506 may include an accelerometer or a gyroscope (or a combination of both) to detect and measure the frequency and/or direction of the user's motion during the gaming session. The temperature sensor 508 may be used to measure the user's hand or skin temperature during the gaming session. The moisture sensor 510 may be used to measure moisture or perspiration levels of the user during the gaming session.

In some embodiments, the condition of the user's hand, as indicated by the measurements from the temperature sensor 508 and the moisture sensor 510, may serve as a proxy for the user's overall wellness, excitement or stress level during the gaming session. Additionally or alternatively, the measurements of the user's hand temperature and moisture levels may be correlated with additional biometric or wellness data collected by one or more other sensors (e.g., motion data collected by the motion sensor(s) 506) to determine one or more physiological characteristics of the user, such as a stress level and/or an excitement level of the user at the time the data was collected. For example, measurements indicating relatively low hand temperature and moisture levels for the user with little to no motion detected may correspond to a low stress level and/or a low excitement level. By contrast, a relatively high hand temperature and/or moisture level with frequent motion detected may indicate a high stress or high excitement level. It is assumed for purposes of this example that the user's motion, temperature, and moisture are detected and/or measured while the user is holding or operating the game controller.

In addition to the sensors shown in FIG. 5A, the game controller may include other sensors or measurement devices for collecting additional biometric or wellness data associated with the user, as shown in FIG. 5B. In FIG. 5B, a bottom view 500B of the game controller of FIG. 5A is shown with a heart rate sensor 512 and an antenna 514. The heart rate sensor 512 may be used to measure a heart rate of the user during the gaming session. In some embodiments, the heart rate measurement from the heart rate sensor 512 may be correlated with the user's hand temperature and moisture data from the respective temperature and moisture sensors 508 and 510 along with the motion data collected by the motion sensor(s) 506 to determine the user's stress level and/or excitement level, as described above. For example, the telemetry from these different sensors may be combined to establish user-specific benchmarks for the biometric data used by the information handling system or hub device (e.g., the server 430) to gauge the user's stress level and/or excitement level during the current gaming session. In some embodiments, such benchmarks may be established and/or updated for the current gaming session based on biometric data collected for the user during one or more previous gaming sessions.

In addition to or as an alternative to detecting the user's motion using the motion sensor(s) 506, the antenna 514 may be used to measure or track the user's movement within one or more gaming environments (e.g., one or more rooms of the user's home, as described above). In some implementations, the antenna 514 may be an ultra-wideband (UWB) antenna used to track a location of the user relative to the known locations of other devices or objects (e.g., furniture) within the gaming environment(s). The user's location may correspond to a location of the game controller relative to one or more reference points (e.g., UWB tags or other network devices) corresponding to the one or more gaming environments. For example, the relative location of the user within a gaming environment may be based on differences in wireless signatures or wireless signal strengths measured or detected by the antenna 514 indicating a relative distance between the user (or controller) and a corresponding reference point (such as another device, a piece of furniture or other object whose location within the gamine environment is known).

Referring back to system 400 of FIG. 4, the measurements collected by the sensors 414 and 424 (e.g., the microphone 502, the fingerprint sensor 504, the motion sensor(s) 506, the temperature sensor 508, the moisture sensor 510, the heart rate sensor 512, and/or the antenna 514 of FIGS. 5A and 5B, as described above) of the respective user devices 410 and 420 may be included in the telemetry data 415 and 425 transmitted to the server 430 via the network 402, as described above.

Server 430 may include or correspond to a computing device (e.g., computing device 114 of FIG. 1). As described above, the server 430 may be configured to host an application or gaming session (e.g., a user session for each user) of gaming application 432 or provide a service (e.g., via gaming assistant 434). Additionally, or alternatively, the server 430 may include or correspond to an information handling system, such as a gaming hub in a user's home environment. In some implementations, the server 430 may be configured as a cloud server in a cloud execution environment.

The server 430 may include one or more processors, such as a CPU or other computing circuitry (e.g., a microcontroller, one or more ASICs, or the like) and may have one or more processing cores. Server 430 may further include a memory 436 and a network interface 438 for communicating with user device 410 and user device 420 over network 402. The network interface 438 may include one or more communication interfaces, such as a LoRa interface, a Wi-Fi interface (e.g., an IEEE 802.11 interface), a cellular interface (e.g., a 4G or LTE interface, a 5G NR interface, or the like), a Bluetooth interface, a BLE interface, a Zigbee interface, a non-LoRa interface, another type of network interface, a combination thereof, or the like. The processor(s), memory 436, network interface 438 and other components of the server 430 may be coupled to each other via a data bus.

The memory 436 of the server 430 may include a read only memory (ROM) device, a random access memory (RAM) device, one or more hard disk drives (HDDs), a flash memory device, a solid state drives (SSDs), another devices configured to store data in a persistent or non-persistent state, or a combination of different memory devices. The memory 436 may be a computer-readable medium used to store one or more instructions, such as instructions or code for the gaming application 432 and the gaming assistant 434. To illustrate, the memory 436 may store instructions that, when executed by the processor(s) of the server 430, cause the processor(s) to perform operations relating to the gaming assistance techniques disclosed herein. Additionally, the memory 436 may be used to store one or more thresholds, data, preferences, other settings, or any combination thereof. In some embodiments, the memory 436 may also be used to store a machine learning (ML) model 452, a gaming context 454 associated with the gaming application 432 or one or more user sessions of the gaming application 432, and interaction data 456.

In some embodiments, the server 430 may execute the gaming assistant 434 (e.g., as a gaming assistance service) alongside the gaming application 432 to analyze the telemetry data received from different user devices (including the user devices 410 and 420) over one or more gaming sessions (e.g., user sessions associated with the respective user devices 410 and 420). Based on the analysis, the gaming assistant 434 may infer relationships between particular users and provide a gaming recommendation to one or more of the users. In some implementations, the gaming recommendation may be a grouping recommendation for a future gaming interaction or gaming session between the users to help build or strengthen the relationships between them, as will be described in further detail below.

In some embodiments, the gaming assistant 434 may analyze the telemetry data to determine performance ratings for each user and use the ratings to identify particular users as potential gaming resources for other users who may need assistance with at least a portion of the gaming application 432 (e.g., a challenging or difficult stage of the game). The grouping recommendation provided by the gaming assistant 434 in this case may be for a gaming assistance session between a first user whose performance rating indicates needs help with a particular stage of the game and a second user whose performance rating indicates can offer help with that particular stage. The grouping recommendation in this example may be transmitted by the server 430 (e.g., as output data 435) to a device (e.g., the user device 410) associated with the first user via the network 402.

In some embodiments, the gaming assistant 434 may include a telemetry analyzer 442, an artificial intelligence (AI) engine 444, and an output generator 446. The telemetry analyzer 442 may receive telemetry data from individual systems and devices of system 400 (e.g., implemented as a gaming system) before, during, and/or after execution of the game application 432. Such telemetry data may include the telemetry data 415 and 425 received via the network 402 from the respective user devices 410 and 420, as described above. The telemetry analyzer 442 may analyze and parse the telemetry data into separate sets of data. The separate sets of data may correspond to wellness data, session data, and relationship data. The parsed telemetry data and/or other representations of the telemetry information may then be provided to the AI engine 444 for further analysis and processing, as will be described in further detail below.

As described above, the wellness data may include various measurements relating to a user's wellness or excitement level, such as the user's heart rate, skin or hand temperature, skin or hand moisture or perspiration levels, motion, etc., as collected by the sensors 414 and 424 of the respective user devices 410 and 420 during each user session. In some implementations, the wellness data may also include additional sensor data. Such additional sensor data may include, for example, location data from a Global Positioning System (GPS) or an antenna of the user's device (e.g., antenna 514 of the game controller shown in FIG. 5). The location data may reveal a location of the user within one or more gaming environments (e.g., one or more rooms of the user's home). In some implementations, the location data may be combined with infrared data from an infrared presence or proximity sensor within a gaming environment to reveal that the user is sitting in front of an AV device (e.g., a device within the gaming environment for displaying a graphical user interface and/or a rendered display from the gaming session).

In some embodiments, the AI engine 444 may combine individual pieces of telemetry received from the telemetry analyzer 442 into a confidence-based knowledge graph of the user's gaming environments and determine a position of the user within that graph. As described above, such a knowledge graph may be based on the relative locations of different devices, the location of the user in relation to each device, and or characteristics of the respective devices. The knowledge graph and the user's location within the one or more gaming environments may be tracked and updated in real time and/or based on changes in device telemetry. For example, the knowledge graph may include information about location of rooms (e.g., environments) in the house based on wireless signatures of devices within the different rooms. The difference in signatures reflects that a peripheral device (e.g., game controller) on one side of the house may receive beacon signals from different neighboring access points than a device on an opposite side of the house. When a user carries the peripheral device around the house, the hub device may determine a location of the peripheral device (and the user) based on visible access points to the peripheral device.

The session data received by the AI engine 444 from the telemetry analyzer 442 may include information relating to one or more gaming characteristics of a user (such as the user's age, gender, level of skill or experience in a particular gaming application or particular stage thereof, and various gaming preferences or other gaming attributes). In some embodiments, the session data may include user input data associated with a corresponding user session of the gaming application 432 based on the input signals received via the input controls 412 and 422 of the respective user devices 410 and 420. For example, the telemetry data 415 received from the user device 410 (and parsed by the telemetry analyzer 442) may include session data indicating the particular input controls 412 used or operated by a corresponding user (e.g., the user's button selections) and other input data captured via the input controls 412 (e.g., text or other input entered by the user) during a corresponding user session of the gaming application 432.

In some implementations, historical session data collected for a user over multiple gaming sessions may be stored in a database (DB) 460 coupled to the server 430. Such historical data may include the user's gameplay history, including historical information about different gaming environments (e.g., different rooms of the user's house) from which the server 430 (e.g., implemented as a hub device) may use current characteristics of at least one of the user's peripheral devices (e.g., user devices 410 and/or 420) to deduce the device's location, and thus current gaming environment of the user. In some implementations, this historical information may be stored within the DB 460 in association with a user profile or account registered to each user associated with the gaming system (e.g., each gamer or family member who resides in a household). The user profile or account may include the user's age, gender, and other relevant data about the user. Additionally, the DB 460 may be used to store device metadata (e.g., in associated with the user's profile), which identifies the user devices 410 and 420 and one or more application environments (such as gaming environments 204A-E of FIG. 2, gaming environments 304A-C of FIGS. 3A-3D, or a combination thereof) in which each user device was detected. The device metadata may include a unique device identifier, a device type, a device manufacturer, a device model, or any combination thereof. In some embodiments, a similar user profile may be stored for each user associated with the gaming environments.

The relationship data included in the telemetry data parsed by the telemetry analyzer 442 may include telemetry information that may be used to identify social connections or relationships between different users. In some cases, the relationship data may be obtained directly from the gaming application 432. For example, the telemetry information from the gaming application 432 itself may indicate that two users played the together in a gaming session (e.g., as teammates or as separate players on different teams in a sports game). As another example, the telemetry may include context information from the gaming application 432 that indicates a game match result listing two users together as different players playing in the same match, such as a list of final standings of a match that includes the names of the individual users who were playing together. Additionally, context information obtained from the gaming application 432 may indicate that two users unlocked the same achievement at approximately the same time. In some implementations, such context information may be stored as gaming context 454 in the memory 436 or as part of a gameplay history associated with various users (or user profiles) stored within DB 460.

In other cases, the information obtained from the gaming application 432 may not always indicate whether two players, who may have been playing the same game at the same time (same date and time), were playing together as a group or playing separately, e.g., individually playing the same game in different gaming environments at or around the same time. Therefore, the telemetry analyzer 442 may further parse and analyze the telemetry information to determine relationships between different users based on their shared interactions or interaction events detected over one or more gaming sessions. In some implementations, the relationship data indicating a relationship between at least two users may be derived from analyzing other available telemetry data, such as session data indicating associations and/or interactions between different users during corresponding user sessions. For example, the telemetry analyzer 442 may compare system information and timestamps to identify at least one other user that a first user was interacting with during a gaming session, such as a second user that the first user was playing with (or against). As another example for analyzing telemetry data, join mechanics based on input data from various game controllers associated with different users may be analyzed, such as determining when a user clicks a button on a first controller (e.g., user device 410) to join a game with a friend or family member using a second controller (e.g., user device 420), and/or whether a user invites another player to join a game. As part of the analysis, the telemetry analyzer 442 may apply thresholds to the telemetry data, such as whether the start and stop time are the same or are within a threshold time period of each other to determine interaction events during corresponding game sessions between two users of an application. The telemetry analyzer 442 may determine that more interaction events may be correlated based on the telemetry data to confirm or provide higher confidence that two individuals play together, even if the gaming application 432 itself does not provide user gameplay information indicating this. The information relating to interactions or interaction events between different users, e.g., as determined from the analysis of telemetry data, may be stored as interaction data 456 in the memory 436.

In some implementations, the telemetry analyzer 442 may apply different confidence levels to certain correlated types of information between different sets of telemetry information. For example, interaction events indicating friend or family groupings (that two friends or family members are playing together), game match results (that a results list contains two users together), and/or join mechanics data (that a user clicks to invite or accept a game with another user) may be considered higher-confidence events relative to other lower-confidence events. Examples of lower-confidence events may include, but are not limited to, in-game presence (that multiple users are playing the same level/mode of a game), in-game session start/stop times (that multiple users are playing the level/mode at the same time), achievement unlocks (multiple users unlocking achievement at same time), location (shared user locations), session start/stop times (that multiple users are playing the game at the same time), game metadata (that the game supports multiple users or multiplayer gaming), performance statistics (e.g., similar win/loss records associated with different users), network access patterns (that may indicate a correlation in system usage, data sockets, or data sources), and other system resource usage or access patterns (e.g., CPU, GPU, and/or memory usage or access patterns that may indicate a correlation in system usage).

In some embodiments, the parsed telemetry data (e.g., the session data, wellness data, and relationship data) along with the gaming context 454 and the interaction data 456 from the telemetry analyzer 442 (and/or the memory 436) may be used by the AI engine 444 to determine potential relationships between different users based on their individual gaming characteristics and shared interactions. For example, the AI engine 444 may analyze the parsed telemetry data output by the telemetry analyzer 442 to identify one or more interaction events (or one or more potential interaction events) that indicate a relationship between a first user and a second user. The interaction events in this example may indicate that a first user session associated with the first user and a second user session associated with the second user correspond to the same application or gaming session, and at least a portion of the first user session and at least a portion of the second user session overlap in time (e.g., occur concurrently).

In some embodiments, the AI engine 444 may use the parsed telemetry data, gaming context 454, and the interaction data 456 to train the ML model 452 to determine potential relationships between different users based on their individual gaming characteristics and shared interactions. In some implementations, the ML model 452 may be an artificial neural network representing a relationship model associated with one or more users (e.g., the first user and/or the second user in the example described above). Based on the user relationships determined using the ML model 452, the AI engine 444 may generate a recommendation for a potential gaming interaction, e.g., a grouping recommendation for a gaming session between these users. The recommendation may then be provided to the output generator 446 to determine output options for transmitting the generated recommendation as output data 435 to the appropriate user or users (or corresponding user device(s) thereof), as will be described in further detail below with respect to FIG. 6.

Figure 6:
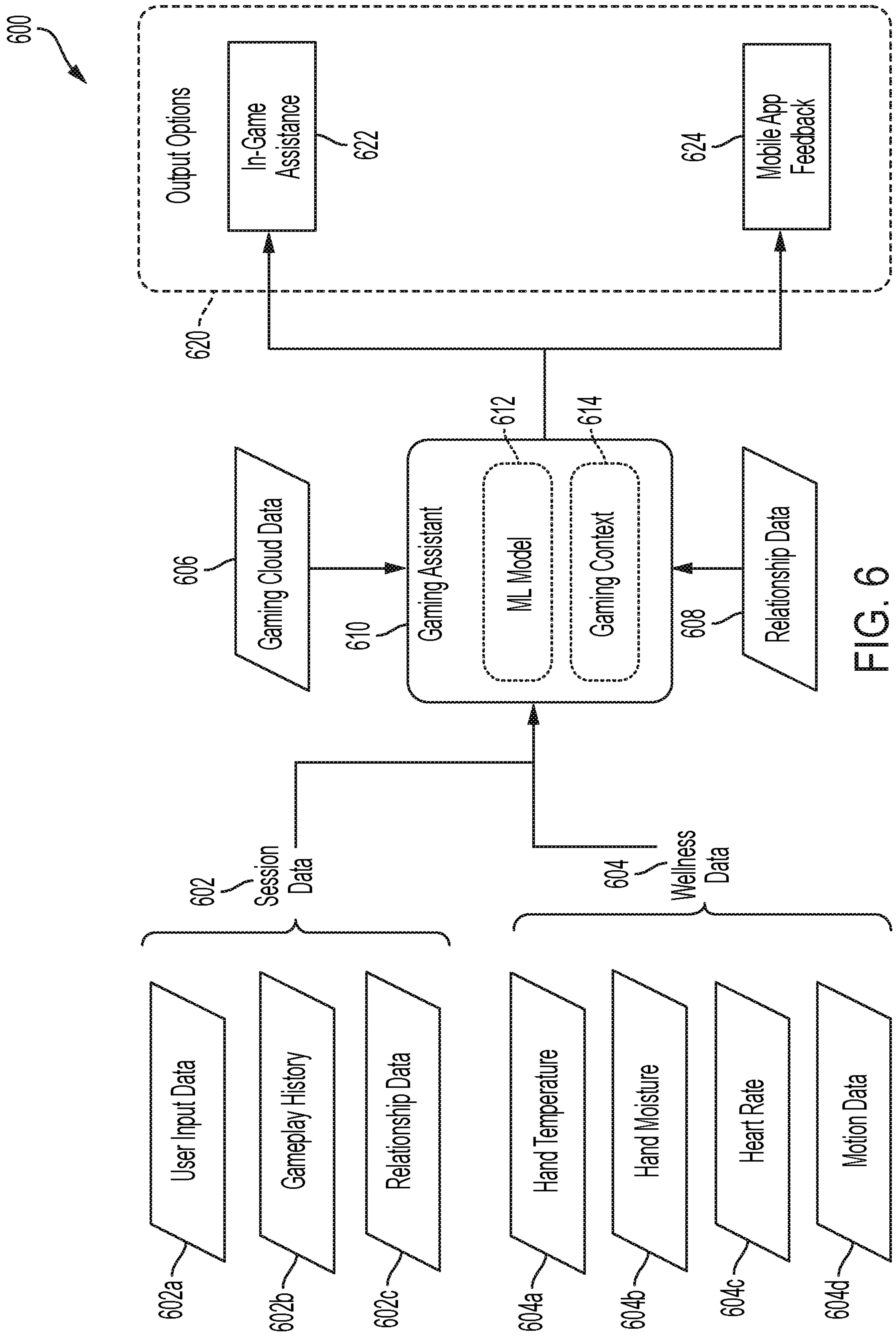
FIG. 6 is a diagram of an example data flow illustrating inputs and outputs of a gaming assistant module or service for providing recommendations to facilitate gaming interactions between users of a gaming application according to some embodiments of the disclosure.

FIG. 6 is a diagram of an example data flow 600 illustrating inputs and outputs of a gaming assistant 610 (e.g., the gaming assistant 434 of FIG. 4) for providing one or more gaming recommendations to users of a gaming application (e.g., gaming application 432 of FIG. 4). As shown in FIG. 6, the inputs of the gaming assistant 610 may include session data 602, wellness data 604, gaming cloud data 606, and relationship data 608. Such inputs may be obtained based on the analysis of telemetry data performed by a telemetry analyzer (e.g., telemetry analyzer 442 of FIG. 4) of the gaming assistant 610. Although not shown in FIG. 6, the inputs of the gaming assistant 610 may also include additional telemetry information, such as system telemetry (e.g., CPU utilization, GPU utilization, memory loads).

The outputs of the gaming assistant 610 may include various output options 620 based on the gaming recommendation(s). In some embodiments, the gaming assistant 610 may be executed by an information handling system or hub device (e.g., the server 430 of FIG. 4) alongside the gaming application to monitor a gaming performance of each user based, at least in part, on telemetry data associated with the user, e.g., the session data 602 and the wellness data 604 received for a user during a corresponding user session. In some implementations, the hub device may be part of a gaming system (e.g., system 400 of FIG. 4) that includes a display device (or "gaming display") for rendering gaming content generated by the gaming application and one or more peripheral devices (e.g., the game controller of FIGS. 5A and 5B) associated with the user. In some embodiments, the session data 602 and the wellness data 604 may be received by the gaming assistant 610 from various data sources. Such data sources may include the peripheral devices (e.g., game controllers) associated with different users (e.g., the user devices 410 and 420 of FIG. 4, as described above) as well as one or more data repositories, such as a local database coupled to the hub device (e.g., the DB 460 of FIG. 4) or a cloud data repository (e.g., an online data repository associated with a cloud gaming service hosted by another information handling system or a cloud computing resource). In some implementations, such a cloud data repository may be used to store gaming cloud data 606.

In some embodiments, the session data 602 may correspond to ecosystem telemetry data (e.g., application session information and user information). For example, the session data 602 may include user input data 602*a*, gameplay history 602*b*, and household data 602*c*. The user input data 602*a* may include input data indicating the particular input controls (e.g., input controls 412 of FIG. 4) of a peripheral device (e.g., game controller) used or operated by a user during the gaming session for the gaming application. In some embodiments, the user input data 602*a* may also include user profile data (e.g., a user's age, gender, etc.) entered by the user before or during the gaming session, e.g., as part of an account registration process via a mobile application executable at the user's mobile device. In addition to the information received from user devices, the session data 602 may include a user's gameplay history 602*b* and household data 602*c*, which may be accessed by the information handling system or gaming assistant 610 from the local database or the cloud data repository described above. Although the gameplay history 602*b* and the household data 602*c* are shown separately from the gaming cloud data 606, it should be appreciated that, in some implementations, the gameplay history 602*b* and the household data 602*c* (or different portions thereof) may be included within the gaming cloud data 606 accessed or received from the cloud data repository, as described above.

The gameplay history 602*b* may include, for example, a user's gaming preferences, such as the user's preferred gaming time(s) (e.g., time of day, day of week, and/or other time period) and the duration of each gaming session at the corresponding time(s). Additionally, the gaming characteristics may include information that is indicative of a user's level of experience or skill, such as an amount of time the user has spent gaming, an amount of time the user has spent playing games in a particular genre, an amount of time the user has spent playing a particular game, a level of completion the user has attained in a particular game, levels of completion the user has attained in games of a particular genre, and in-game performance statistics, such as kill/death ratios, speed-run time records and other statistical data regarding the user's gaming performance obtained from the gaming application during each user session.

The household data 602*c* may include information about the size of a user's house, the location of rooms (or gaming environments) within the house, the identity of other users/gamers (e.g., family members) who reside in the house, and any other relevant information about the user's location relative to that of other users within the gaming environments. As described above, such information may be based on a knowledge graph indicating the locations of various devices within each gaming environment based on differences between the wireless signatures and other characteristics of devices and/or access points associated with each environment.

The wellness data 604 may include measurements (e.g., biometric measurements) relating to the user's health or wellness as collected by the one or more sensors 414 that are coupled to or integrated with the user device 410 (e.g., a game controller). The wellness data 604 may include, for example, hand or skin temperature data 604*a* (e.g., as measured by the temperature sensor 508 of FIG. 5A), hand or skin moisture data 604*b* (e.g., as measured by the moisture sensor 510 of FIG. 5A), heart rate data 604*c* (e.g., as measured by the heart rate sensor 512 of FIG. 5B), and motion data 604*d* (e.g., as measured by the one or more motion sensors 506 of FIG. 5A).

The relationship data 608 may include any information that may be used to establish a relationship between the user and other users within one or more gaming environments (e.g., different rooms of the user's house). Such information may be obtained from the user profile data described above and/or the profile data associated with other related users (e.g., other members/gamers of the user's family who also reside in the house). The relationship data 608 may indicate, for example, if the user is playing alone within the gaming environment or if there are any other known users located nearby. The indication may be based on, for example, the recognition of another user's voice captured by a microphone coupled to or integrated with a peripheral device of the user (e.g., the microphone 502 of the game controller of FIG. 5, as described above) during the gaming session. In some embodiments, the relationship data 608 may include interaction data (e.g., interaction data 456 of FIG. 4) indicating one or more interaction events associated with different users and user devices during corresponding user sessions. Such interaction events may include, for example, one or more events associated with a first user device (and first user session), one or more events associated with a second user device (and second user session), one or more location events associated with the first and second user devices, or any combination of the foregoing.

In some embodiments, the operations performed by the gaming assistant 610 may include training a ML model 612 (e.g., the ML model 452 of FIG. 4) based on the telemetry information processed by the telemetry analyzer. In some implementations, the ML model 612 may represent a user relationship model associated with one or more users. The gaming assistant 610 may use the ML model 612 to determine an occurrence of a first event for a first user in a first application and determine an occurrence of a second event for a second user in a second application. The gaming assistant 610 may determine a relationship between the second user and the first user based on the first event, the second event, and the model 612 (e.g., the user relationship model). The gaming assistant 610 may update a user session (or session history) associated with the first user to indicate the relationship between the first user and the second user. The gaming assistant 610 may then determine or generate a gaming recommendation to be provided (e.g., by the output generator 446 of FIG. 4) to the first user (or transmitted to a device thereof) using one or more of the output options 620.

In some embodiments, the gaming assistant 610 may use the model 612 and a gaming context 614 associated with the gaming application to identify a potential correlation or grouping of different user interactions or interaction events based, at least in part, on the received telemetry data, including the session data 602, the wellness data 604, and the relationship data 608. Based on an identified potential interaction event, the gaming assistant 610 may score, classify, or categorize the interaction event into different types of interactions or interaction events. In determining relationships between at least two users, data associated with an interaction events of a given type may be assigned different weights and a value reflecting the likelihood of a successful grouping or match between the users may be determined based on an aggregate of the assigned weights or weighted values. For example, weights may be assigned to different gaming characteristics of each user for a given type of interaction event. In some implementations, the weights may be determined based on the telemetry data described above, the gaming context 614, gaming cloud data 606 obtained from a cloud repository, machine learning, or any combination of the foregoing. Examples of different gaming characteristics for which weighted values may be assigned or determined for each user include, but are not limited to, a relative degree of each user's general gaming experience, a level of experience in a particular gaming genre, a level of experience in a particular gaming application or a particular stage thereof, an age of each user, one or more languages spoken by each user, a gaming style of each user (such as the type of games the user prefers to play), and other gaming preferences or characteristics of each user (such as whether the user prefers longer or shorter gaming sessions). In some embodiments, a sum of the weighted values for a potential relationship match or grouping between different users may be assigned a rating or score indicating a quality of the potential match. If there are significant disparities between the skill levels, gaming preferences, ages, and/or spoken language(s) of the respective users, the potential match may receive a low rating and no gaming (or grouping) recommendation may be generated as a result.

In some embodiments, the gaming assistant 610 may also use the model 612 to monitor or determine each user's gaming performance with respect to at least a portion of a gaming application (e.g., a stage of the gaming application) based on the telemetry data associated with one or more user sessions of the gaming application. For example, the gaming assistant 610 may analyze the telemetry data (including the session data 602 and the wellness data 604) to determine one or more gaming characteristics that relate to each user's performance, such as the user's skill level, level of experience in the gaming application (or particular stage thereof), and level of excitement. The session data 602 may indicate one or more gaming characteristics of the user, such as the skill and/or experience level of the user, during the gaming session. The wellness data 604 may indicate an excitement level or mood of the user during the gaming session, such as whether the user in a mood that is receptive to receiving gaming assistance. For example, the gaming assistant 610 may determine that a first user needs assistance with at least a portion of the gaming application during the gaming session if, for example, the analysis of the session data 602 indicates that the skill level of the first user is below a threshold experience or skill level for that portion of the gaming application and the analysis of the wellness data 604 indicates that the user is in a mood that is receptive to gaming assistance. The threshold experience/skill level may be based on the experience/skill level of a second user.

In some embodiments, the gaming assistant 610 may assign a performance rating to each user with respect to the portion of the gaming application, based on the determined gaming characteristics. The gaming assistant 610 may use the performance ratings along with the gaming context 614 to classify the users according to which users need assistance with the portion of the gaming application and which users may be willing and/or capable of providing assistance. For example, the gaming assistant 610 may use the performance ratings to determine that the second user in the above example has a level of experience or skill with respect to one or more stages of the gaming application with which the first user needs assistance. The performance rating of the second user in this example may indicate that the second user's level of skill or experience exceeds that of the first user's (e.g., based on each user's relative level of general gaming experience, experience playing the particular portion or stage of the game, progress attained in the game, experience playing games of the same type or genre, and other gaming experience or gaming skill indicators). In some implementations, the gaming assistant 610 may positively weight the second user's rating if it is determined that the second user also shares one or more other gaming characteristics with the first user, such as a preferred gaming genre, age, gaming time, etc. Additionally or alternatively, the second user's rating may be positively weighted if the excitement level or mood of the second user, as indicated by the wellness data 604 recently received for the second user (e.g., during a corresponding second user session within the past day), indicates that the second user enjoys playing the game and/or is willing to offer assistance.

The gaming context 614 in the above examples may be used to identify a type of the gaming application (e.g., single-player vs. multi-player game), the gaming genre or category of the gaming application, the recommended age rating of the gaming application, and the type of gaming environment (e.g., a local gaming environment vs. an online or cloud-based gaming environment) supported by the gaming application. In some implementations, the gaming context 614 for the gaming application may be determined based on the gaming cloud data 606 acquired from an online or cloud data repository associated with a cloud gaming service, as described above. In some implementations, the online data repository may also serve as a resource or reference guide for relevant gaming advice, tips, or assistance information for providing gaming assistance (e.g., as one or more of the output options 620) to one or more users. Accordingly, the gaming cloud data 606 may further include information that may be used to provide gaming assistance as an output of the analysis performed using the model 612.

In some embodiments, the gaming assistance may correspond to one or more of the output options 620. The output options 620 may include, for example, in-game assistance 622 provided to a user (e.g., the first user in the above examples) via an on-screen display with assistance information superimposed on the gaming content rendered for the gaming application during a current user session and/or mobile application feedback 624 provided via an interface of a mobile application executable at a mobile device of the user (e.g., the user device 410 of FIG. 4). For example, the in-game assistance 622 may be output by the gaming assistant 610 (e.g., using the output generator 446 of FIG. 4) for display to the user via a graphical user interface (GUI) of a display of the gaming system. to indicate the recommended users with correlated gaming characteristics.

In some embodiments, the in-game assistance 622 and/or mobile application feedback 624 options provided to the first user may initially include a recommendation for gaming assistance along with a request for the first user to confirm that assistance is needed and/or desired. Thus, any actual assistance may be provided only after the gaming assistant 610 receives the requested confirmation from the first user. For example, if confirmation is received from the first user, the gaming assistant 610 may provide a list of recommended users (e.g., including the second user in the above examples) who can offer help to the first user determined to need assistance. The gaming assistant may also initiate a gaming assistance session (or transmit a link for the first user to do so) with one or more of the recommended users selected by the first user from the list. The gaming assistant 610 may further provide the first user with information regarding gaming characteristics of the recommended users who can offer help, such as a number of hours each of the recommended users on the list has spent playing the game or stage for which assistance is needed or desired by the first user.

In some implementations, the recommendation provided by the gaming assistant 610 may further include additional gaming recommendations based on common or shared gaming characteristics identified for multiple users in a group. In some implementations, the gaming assistant 610 may provide a grouping recommendation for a gaming session between multiple users (or gamers) in the same household who are more likely to play the same games. For example, the gaming assistant 610 may determine from telemetry data associated with first and second user sessions that corresponding first and second users (e.g., two family members or roommates residing in the same house) are separately playing the same game at the same time in different gaming environments (e.g., different bedrooms of the house). Each user session in this example may be associated with a different gaming environment. The gaming assistant 610 may therefore send a recommendation for a new gaming session in which both users can play together in the same environment, e.g., as designated by either user or by the gaming assistant 610 as part of the recommendation. The recommendation may be sent to one of the users with an option to invite the other user to join the first user's gaming session. Additionally or alternatively, a recommendation may be sent to both users, where each user must agree to the new gaming session before the different user sessions are combined into a single gaming session at a designated gaming environment. The designated gaming environment may be, for example, a living room, a game room, or other common area of the house. However, it should be appreciated that the designated gaming environment may be the same as one of the gaming environments associated with the existing user sessions (e.g., either the first or second user's bedroom). If confirmation is received from at least one of the users in this example, the gaming assistant 610 may initiate the new gaming session in the designated gaming environment. It should be appreciated that confirmation from both users may be required in some implementations and that either user may consent to receiving or providing performance assistance in advance.

To improve user experience and minimize disruption in gameplay, the gaming assistant 610 in the above example may transfer relevant session information associated with the existing user sessions to the new gaming session so that each user may continue playing the game with the same character or other user-specific game selections and settings saved from their existing or previous sessions. Additionally, each user device (e.g., game controller) and other aspects of the respective user sessions may be migrated and reconfigured for operation in the designated or new gaming environment (e.g., environment 204A corresponding to living room 202B of FIG. 2, as described above) from a configuration for the previous environment (e.g., environment 204C corresponding to bedroom 202D of FIG. 2). For example, each user device may be reconfigured to pair and communicate with other devices (such as a TV or AV system) in the new environment. Furthermore, the gaming assistant 610 may migrate the gaming application (e.g., the gaming application 432 of FIG. 4), including the game content to be displayed for the application, from a TV or AV system in the previous environment (e.g., bedroom 202D) to a TV or AV system in the new environment (e.g., living room 202B) while remaining connected to host services (including the gaming assistance service) executing at the information handling system or hub device (e.g., server 430). It should be appreciated that the hub device in this example may be located in a different gaming environment (e.g., bedroom 202F of FIG. 2) within the same house or in a remote, cloud-based environment (e.g., gaming environment 304B of FIG. 3D, as described above).

As another example, the gaming assistant 610 may provide a rich session history for user timeline view and profile page indicating overlap of a user's games and another user's games, and may include statistics from those games, as part of a "journey together" or collaborative gameplay session between the users. As a further example, the gaming assistant 610 may generate party highlights mixing recorded/captured content from multiple users. Further examples of output from gaming assistant 610 may include communications orchestration, social/sharing prioritization, game recommendations, party identification, scheduled event coordination (tournaments, social events, etc.), third-party offer coordination and prioritization, coordinated recommendations on streamers/influencers, coordinated recommendations on media and content (channels, news, music, etc.), competitive skill analysis and training recommendations, eSports recruiting and events, massively multiplayer online game (MMOG) recruiting and events, targeted advertising, matchmaking and/or "pick-up"-style gameplay enablement, couch gaming intent recognition, relay-style gameplay (in which one game is handed off across multiple users), peripheral rotation (offering the switching of characters during gameplay), game party treasure hunt mode, and/or intelligent push notifications to remotely join a gaming session in progress.

Figure 7:
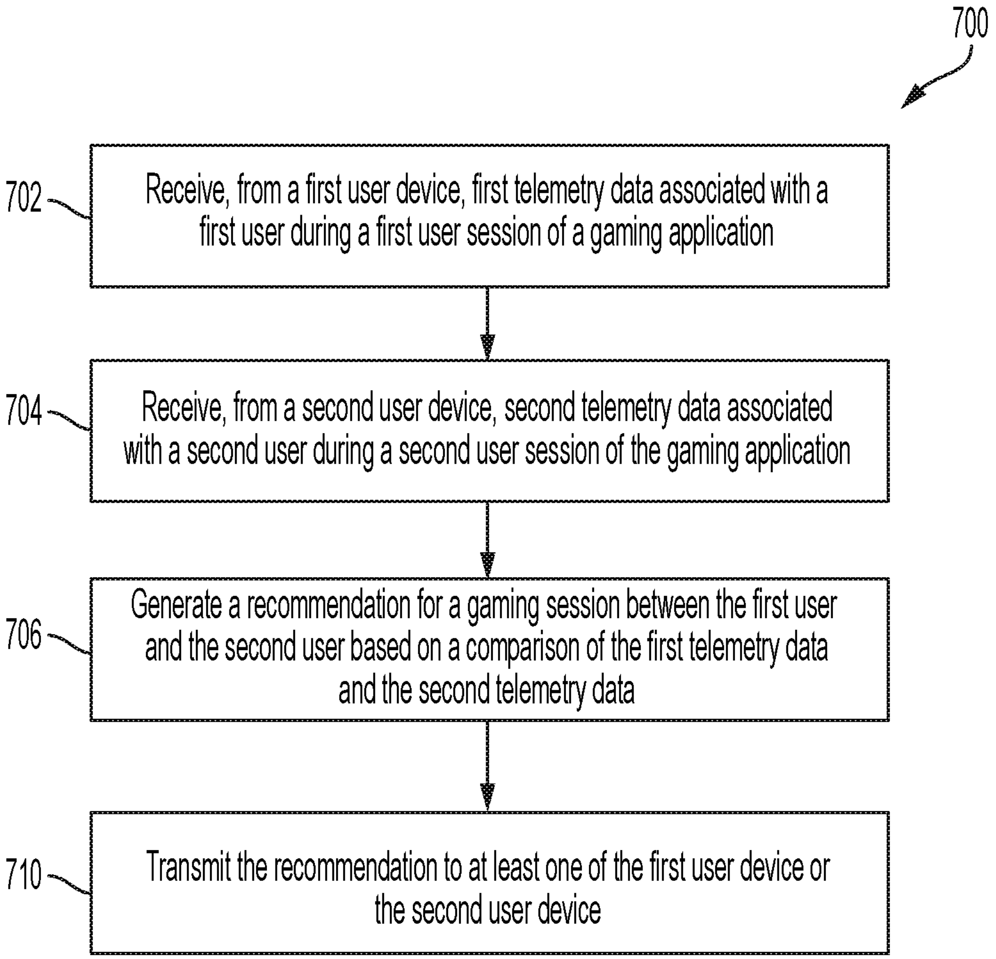
FIG. 7 is a flow diagram of an example method for providing recommendations to facilitate gaming interactions between users of a gaming application according to some embodiments of the disclosure.

FIG. 7 is a flow diagram of an example method 700 for providing recommendations to facilitate gaming interactions between users of a gaming application according to some embodiments of the disclosure. Method 700 may be performed by an information handling system or hub device, such as the server 430 of FIG. 4, as described above.

Method 700 begins at block 702, which includes receiving, from a first user device, first telemetry data associated with a first user during a first user session of a gaming application (e.g., the gaming application 432, as described above) executed by the information handling system. The method 700 then proceeds to block 704, which includes receiving, from a second user device, second telemetry data associated with a second user during a second user session of the gaming application. In some embodiments, each of the first and second user devices may be a wireless game controller associated with the respective first and second users.

In some embodiments, the first and second telemetry data may each include session data, wellness data, and relationship data associated with the respective first and second users. The session data associated with each user may be indicative of one or more gaming characteristics of the user, such as a skill or experience level of the user with respect to at least a portion of the gaming application (such as a stage of the gaming application). The wellness data associated with each user may be indicative of one or more physiological characteristics of the user, such as an excitement level of the user. In some embodiments, the wellness data may include sensor measurements received from a peripheral device (such as a game controller) of the user (e.g., the user device 410 of FIG. 4) during the gaming session. The peripheral device may include, for example, one or more sensors for collecting the sensor measurements. In some embodiments, the one or more sensors may include one or more of: a moisture sensor to measure hand moisture; a temperature sensor to measure hand temperature; a heart rate sensor to measure heart rate; at least one location sensor (e.g., a GPS and/or a wireless antenna) to measure a location of the user; and at least one motion sensor (e.g., an accelerometer and/or a gyroscope) to detect motion or measure a movement of the user.

At block 706, a recommendation for a gaming interaction between the first user and the second user is generated based on a comparison of the first telemetry data and the second telemetry data. The recommendation is then transmitted at block 708 to at least one of the first user device or the second user device.

In some embodiments, the recommendation may be for a gaming assistance session for the first user, based on a comparison of performance ratings associated with the respective first and second users. As described above, the telemetry data received for each user may be used to determine a performance rating for that user. Thus, a first performance rating of the first user may be determined for a portion of the gaming application (e.g., a particular stage of the game), based on the first telemetry data. Likewise, a second performance rating of the second user may be determined for the portion of the gaming application, based on the second telemetry data. In some implementations, the recommendation for a gaming assistance session may be generated at block 706 and transmitted to the first user device at block 708 when the first performance rating of the first user is below a threshold performance rating and the second performance rating of the second user meets or exceeds the threshold performance rating. The threshold performance rating may be based on, for example, an average performance rating of other users with respect to the portion of the gaming application.

In some embodiments, a performance rating may be assigned to each user of the gaming application (e.g., including the first and second users in the above example and any other users in the same gaming community or social group). The performance ratings may be used to differentiate the users according to their potential for offering or providing assistance (e.g., based on their level of experience or skill) with at least a portion of the gaming application (e.g., a challenging or difficult stage of the game). For example, users assigned a relatively high performance rating may be more likely to offer help with the portion of the gaming application. Conversely, users assigned relatively lower ratings (e.g., due to their inexperience with the game or stage thereof) may be in need of help. Thus, the performance rating assigned to each user may reflect a gaming assistance score that rates each user's ability to provide gaming assistance, which may be related to, but separate from, the user's gaming skill level. For example, the performance rating or gaming assistance score assigned to a user may be based on a combination of the user's skill level (e.g., based on session data acquired for the user over one or more user sessions) and the user's excitement level or mood (e.g., based on wellness data acquired for the user during a current or recent user session). The skill level of each user may be based on, for example, the amount of time the user has spent playing the game or stage thereof, the user's level of achievement or progress in the game or stage, and any other performance metric that may be available. The user's excitement level may be indicative of the user's willingness to provide or offer help to other users. Examples of user performance ratings and associated use cases or scenarios will be described in further detail below with respect to FIGS. 8A, 8B, and 9.

Figure 8A:
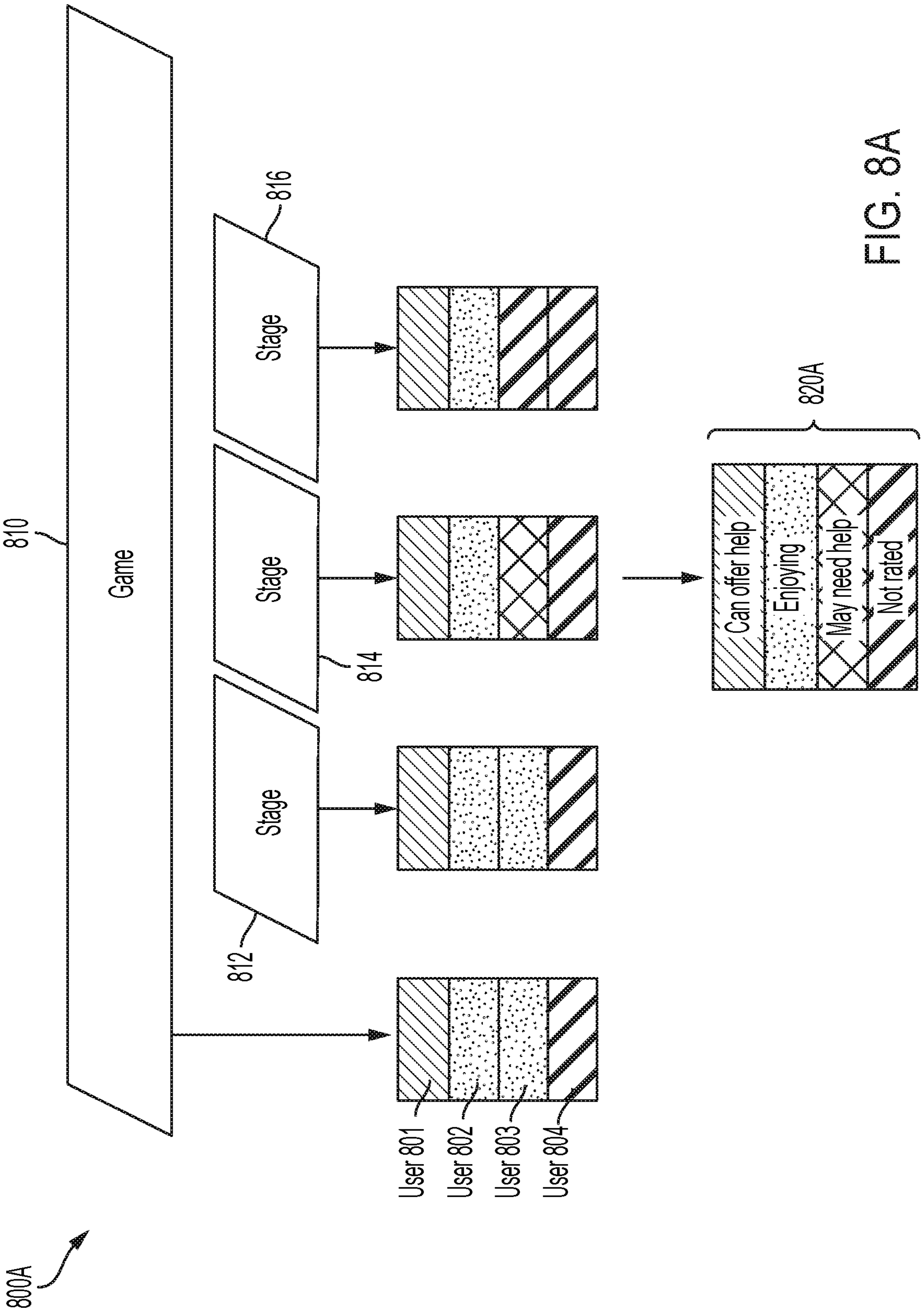
FIG. 8A is a diagram illustrating an example of a rating scheme for assigning performance ratings to users for different stages of a game according to some embodiments of the disclosure.

FIG. 8A is a diagram illustrating an example of a rating scheme 800A for assigning performance ratings to users for different stages of a game 810 according to some embodiments of the disclosure. Game 810 may include, for example, a stage 812, a stage 814, and a stage 816. While only these three stages are shown in FIG. 8A, it should be appreciated that game 810 may include any number of stages. Game 810 in this example. Game 810 may be any of various single-player or multi-player games, as described above. Game 810 may be played by various users including, for example, a user 801, a user 802, a user 803, and a user 804 (collectively, "users 801-804"). It should be appreciated that each of users 801-804 may play game 810 either separately (e.g., during separate user sessions initiated by the users 801-804 individually) or together (e.g., during a multi-player gaming session initiated by at least one of the users 801-804).

In some embodiments, a performance rating may be assigned to each of users 801-804 for each of stages 812, 814, and 816 of game 810. As described above, the performance rating assigned to each user may be based on a combination of the user's skill level (which may indicate the user's ability to offer help to other users) and the user's excitement level or mood (which may indicate the user's willingness to offer help). In some implementations, the rating assigned to each user may be selected from a set of predefined ratings 820A that may be used to categorize the users according to their potential for offering assistance or needing assistance with a particular stage of the game 810 or potential for needing assistance with a particular stage. For example, the performance rating assigned to user 801 for stage 814 of game 810 indicates that user 801 "can offer help" with this stage of the game while the rating for user 803 indicates that user 803 "may need help" with stage 814. Accordingly, the disclosed gaming assistance techniques (e.g., as implemented by the gaming assistant 434 of FIG. 4 or the gaming assistant 610 of FIG. 6, as described above) may be used to generate a recommendation for a gaming assistance session between user 801 and user 803. The recommendation may be sent to a device associated with user 803. In some implementations, a prompt requesting confirmation that user 803 agrees to receive gaming assistance from user 801 for stage 814 may be displayed before the gaming assistance session is initiated. The prompt may be displayed via, for example, a display device in a gaming environment associated with the user 803 (or corresponding user session of game 810).

FIG. 8B is a table 800B illustrating different input scenarios for assigning different user ratings 820B using the rating scheme 800A of FIG. 8A according to some embodiments of the disclosure. The user rating for each input scenario may be based on a combination of a user's gaming performance (e.g., based on in-game performance metrics), excitement level (based on wellness data), and skill or experience level (based on session data). For example, a rating of "can offer help" may be assigned to a user if the performance metrics indicate that the user's gaming performance meets or exceeds a threshold performance level or rating (e.g., a "good" performance rating), the wellness data indicates that the user's excitement level meets a threshold excitement level (e.g., "normal excitement"), and the session data indicates that the user meets a threshold skill level (e.g., has sufficient play time and cadence or progress in the game).

FIG. 9 is a table 900 with examples of different scenarios for providing recommendations for gaming interactions between users of a gaming application based, at least in part, on performance ratings (or user ratings) assigned to the users according to some embodiments of the disclosure. The recommendation may also be based on relationship data indicating a social connection or relationship between multiple users as well as a gaming context relating to the type or genre of the games played by the various users. The recommendations may include grouping recommendations for potential gaming interactions between different users determined to have a relationship or social connection based on previous interactions or interaction events detected from session data collected during multiple user sessions over time. An example of such a grouping recommendation may include a recommendation or suggestion for a gaming session between at least two users determined to have one or more shared interactions and/or one or more common gaming characteristics (e.g., similar ages and interests in the same types of games). The recommendation for the gaming session in this example may be provided to one or both of the users.

In some embodiments, the gaming session may be for a game or gaming application (e.g., gaming application 432 of FIG. 4) executed by an information handling system or hub device (e.g., system 430 of FIG. 4). In some implementations, the hub device may be part of a gaming system that includes a display device (or "gaming display") for rendering gaming content generated by the gaming application as well as one or more peripheral devices (e.g., the game controller of FIGS. 5A and 5B) associated with the respective users. As described above, the telemetry data may include session data indicating one or more gaming characteristics of the user, biometric data indicating one or more physiological characteristics of the user (such as the user's level of stress during the gaming session), and relationship data indicating social connections between the user and other users associated with one or more gaming environments (e.g., one or more rooms of the user's house) in which the gaming session (or similar gaming sessions take place). The telemetry data for the user in each scenario may be analyzed by an AI engine (e.g., the AI engine 444 of FIG. 4) of a gaming assistant (e.g., gaming assistant 434 of FIG. 4 or gaming assistant 610 of FIG. 6) executed by the information handling system alongside the gaming application, as described above.

As shown in FIG. 9, the first row of table 900 corresponds to a scenario 910, where the user ratings indicate that three or more users are enjoying the game or can offer help to other users. The relationship data in scenario 910 indicates that there is at least one circumstance where multiple users (e.g., members of the same family) played together. Given a gaming context of a popular multi-user game, the AI engine in this scenario many send a grouping recommendation for a multi-user gaming session of a particular game (or similar games in the same genre that may be promoted for consideration). The recommendation may be sent, for example, as a gaming session invitation to all users in the group to facilitate gaming interactions and social relationships between the users (e.g., an invitation to all family members for a family get-together to play one or more of the promoted games).

The grouping recommendation in a scenario 920 may be, for example, a notification of a recent achievement by a first user, which may be sent to the user's gaming buddies. The grouping recommendation in a scenario 930 may be a recommendation for a family game night or get-together similar to the recommendation in scenario 910. In a scenario 940, at least one of the users who may need gaming assistance is a minor. The grouping recommendation in this scenario may be a message informing the user's parents of the need for gaming assistance with suggested resources that may be available to provide potential gaming assistance for the user (child). In a scenario 950, the recommendation may be for a gaming assistance session between a first user identified or rated as needing help and a second user identified or rated as being able to offer help.

In addition to the grouping recommendations described above in the scenario examples of FIGS. 8 and 9, it should be appreciated that the gaming assistant may be used to provide other types of grouping recommendations, such as recommendations for collaborative-based games rather than competition-based games to promote social connections or family relationships. This type of wellness assistance may be based on analysis of the telemetry data, including relationship data, session data, and wellness data, collected for each user (e.g., each family member within a household) across different gaming environments (e.g., different rooms of the house).

FIG. 10 is a table 1000 with additional examples of different scenarios for providing recommendations for gaming interactions to facilitate relationships or connections between different family members who are also gamers according to some embodiments of the disclosure. While the scenarios in table 1000 are described in the context of family relationships, it should be appreciated that the techniques disclosed herein may be applied to facilitate social relationships between gamers in general (e.g., gamers affiliated with a gaming club, gaming interest group, or other local or online gaming organization or community).

Figure 11:
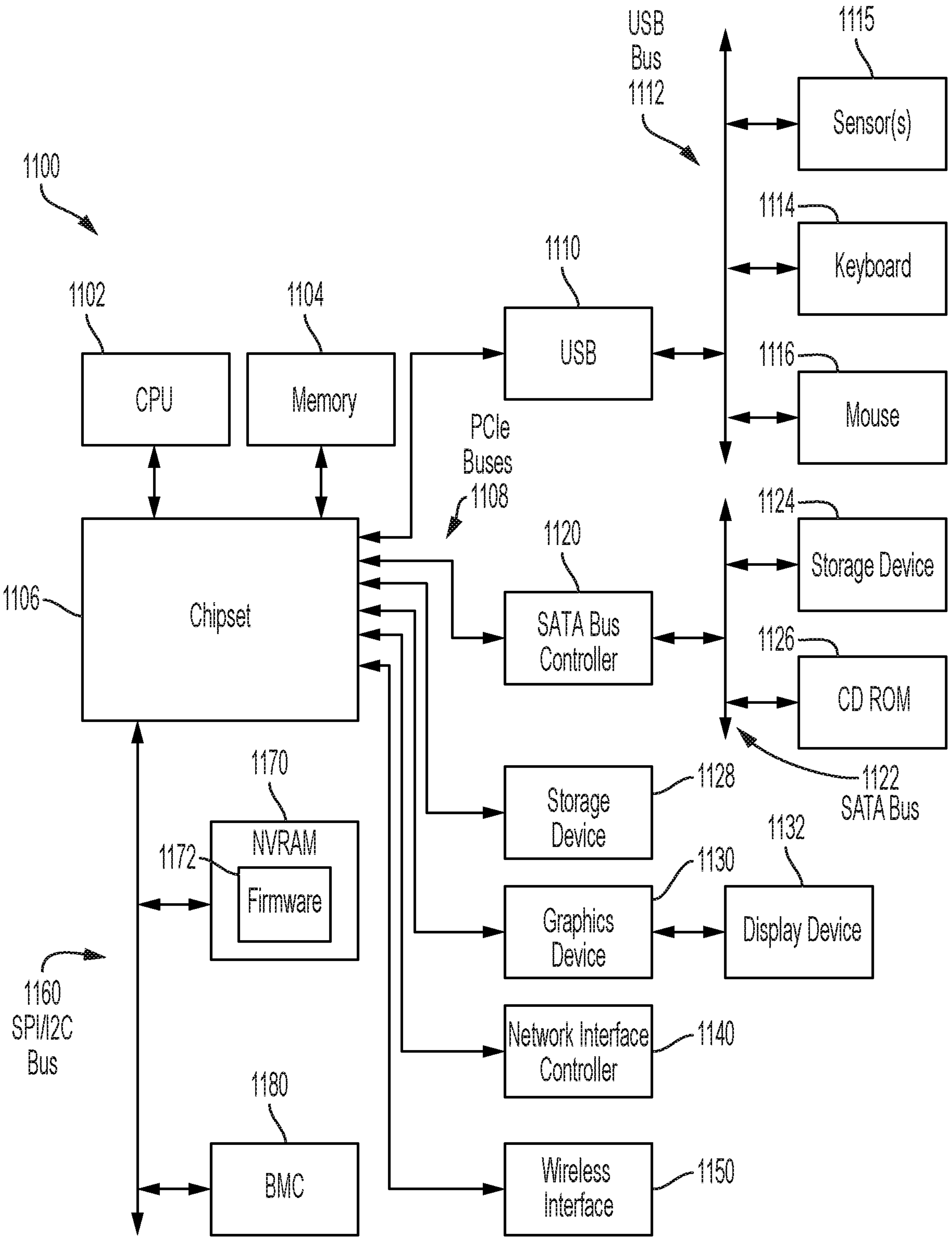
FIG. 11 is a schematic block diagram of an example information handling system according to some embodiments of the disclosure.

FIG. 11 illustrates an example information handling system 1100. Information handling system 1100 may include a processor 1102 (e.g., a central processing unit (CPU)), a memory (e.g., a dynamic random-access memory (DRAM)) 1104, and a chipset 1106. In some embodiments, one or more of the processor 1102, the memory 1104, and the chipset 1106 may be included on a motherboard (also referred to as a mainboard), which is a printed circuit board (PCB) with embedded conductors organized as transmission lines between the processor 1102, the memory 1104, the chipset 1106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1102, the memory 1104, the chipset 1106, and/or other components may be organized as a System on Chip (SoC).

The processor 1102 may execute program code by accessing instructions loaded into memory 1104 from a storage device, executing the instructions to operate on data also loaded into memory 1104 from a storage device, and generate output data that is stored back into memory 1104 or sent to another component. The processor 1102 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1106 may facilitate the transfer of data between the processor 1102, the memory 1104, and other components. In some embodiments, chipset 1106 may include two or more integrated circuits (ICs), such as a northbridge controller coupled to the processor 1102, the memory 1104, and a southbridge controller, with the southbridge controller coupled to the other components such as USB 1110, SATA 1120, and PCIe buses 1108. The chipset 1106 may couple to other components through one or more PCIe buses 1108.

Some components may be coupled to one bus line of the PCIe buses 1108, whereas some components may be coupled to more than one bus line of the PCIe buses 1108. One example component is a universal serial bus (USB) controller 1110, which interfaces the chipset 1106 to a USB bus 1112. A USB bus 1112 may couple input/output components such as a keyboard 1114 and a mouse 1116, but also other components such as USB flash drives, or another information handling system. Another example component is a SATA bus controller 1120, which couples the chipset 1106 to a SATA bus 1122. The SATA bus 1122 may facilitate efficient transfer of data between the chipset 1106 and components coupled to the chipset 1106 and a storage device 1124 (e.g., a hard disk drive (HDD) or solid-state disk drive (SDD)) and/or a compact disc read-only memory (CD-ROM) 1126. The PCIe bus 1108 may also couple the chipset 1106 directly to a storage device 1128 (e.g., a solid-state disk drive (SDD)). A further example of an example component is a graphics device 1130 (e.g., a graphics processing unit (GPU)) for generating output to a display device 1132, a network interface controller (NIC) 1140, and/or a wireless interface 1150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1106 may also be coupled to a serial peripheral interface (SPI) and/or Inter-Integrated Circuit (I2C) bus 1160, which couples the chipset 1106 to system management components. For example, a non-volatile random-access memory (NVRAM) 1170 for storing firmware 1172 may be coupled to the bus 1160. As another example, a controller, such as a baseboard management controller (BMC) 1180, may be coupled to the chipset 1106 through the bus 1160. BMC 1180 may be referred to as a service processor or embedded controller (EC). Capabilities and functions provided by BMC 1180 may vary considerably based on the type of information handling system. For example, the term baseboard management system may be used to describe an embedded processor included at a server, while an embedded controller may be found in a consumer-level device. As disclosed herein, BMC 1180 represents a processing device different from processor 1102, which provides various management functions for information handling system 1100. For example, an embedded controller may be responsible for power management, cooling management, and the like. An embedded controller included at a data storage system may be referred to as a storage enclosure processor or a chassis processor.

System 1100 may include additional processors that are configured to provide localized or specific control functions, such as a battery management controller. Bus 1160 can include one or more busses, including a Serial Peripheral Interface (SPI) bus, an Inter-Integrated Circuit (I2C) bus, a system management bus (SMBUS), a power management bus (PMBUS), or the like. BMC 1180 may be configured to provide out-of-band access to devices at information handling system 1100. Out-of-band access in the context of the bus 1160 may refer to operations performed prior to execution of firmware 1172 by processor 1102 to initialize operation of system 1100.

Firmware 1172 may include instructions executable by processor 1102 to initialize and test the hardware components of system 1100. For example, the instructions may cause the processor 1102 to execute a power-on self-test (POST). The instructions may further cause the processor 1102 to load a boot loader or an operating system (OS) from a mass storage device. Firmware 1172 additionally may provide an abstraction layer for the hardware, such as a consistent way for application programs and operating systems to interact with the keyboard, display, and other input/output devices. When power is first applied to information handling system 1100, the system may begin a sequence of initialization procedures, such as a boot procedure or a secure boot procedure. During the initialization sequence, also referred to as a boot sequence, components of system 1100 may be configured and enabled for operation and device drivers may be installed. Device drivers may provide an interface through which other components of the system 1100 can communicate with a corresponding device. The firmware 1172 may include a basic input-output system (BIOS) and/or include a unified extensible firmware interface (UEFI). Firmware 1172 may also include one or more firmware modules of the information handling system. Additionally, configuration settings for the firmware 1172 and firmware of the information handling system 1100 may be stored in the NVRAM 1170. NVRAM 1170 may, for example, be a non-volatile firmware memory of the information handling system 1100 and may store a firmware memory map namespace 1100 of the information handling system. NVRAM 1170 may further store one or more container-specific firmware memory map namespaces for one or more containers concurrently executed by the information handling system.

Information handling system 1100 may include additional components and additional busses, not shown for clarity. For example, system 1100 may include multiple processor cores (either within processor 1102 or separately coupled to the chipset 1106 or through the PCIe buses 1108), audio devices (such as may be coupled to the chipset 1106 through one of the PCIe busses 1108), or the like. While a particular arrangement of bus technologies and interconnections is illustrated for the purpose of example, one of skill will appreciate that the techniques disclosed herein are applicable to other system architectures. System 1100 may include multiple processors and/or redundant bus controllers. In some embodiments, one or more components may be integrated together in an integrated circuit (IC), which is circuitry built on a common substrate. For example, portions of chipset 1106 can be integrated within processor 1102. Additional components of information handling system 1100 may include one or more storage devices that may store machine-executable code, one or more communications ports for communicating with external devices, and various input and output (I/O) devices, such as a keyboard, a mouse, and a video display.

In some embodiments, processor 1102 may include multiple processors, such as multiple processing cores for parallel processing by the information handling system 1100. For example, the information handling system 1100 may include a server comprising multiple processors for parallel processing. In some embodiments, the information handling system 1100 may support virtual machine (VM) operation, with multiple virtualized instances of one or more operating systems executed in parallel by the information handling system 1100. For example, resources, such as processors or processing cores of the information handling system may be assigned to multiple containerized instances of one or more operating systems of the information handling system 1100 executed in parallel. A container may, for example, be a virtual machine executed by the information handling system 1100 for execution of an instance of an operating system by the information handling system 1100. Thus, for example, multiple users may remotely connect to the information handling system 1100, such as in a cloud computing configuration, to utilize resources of the information handling system 1100, such as memory, processors, and other hardware, firmware, and software capabilities of the information handling system 1100. Parallel execution of multiple containers by the information handling system 1100 may allow the information handling system 1100 to execute tasks for multiple users in parallel secure virtual environments.

The schematic or flow diagram of FIG. 7 is generally set forth as a logical flow chart diagram, as well as some of the operations described with reference to other drawings, such as FIG. 6. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as adaptive boosting (AdaBoost) or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:

receiving, by a hub device from a first user device, first telemetry data associated with a first user during a first user session of a gaming application;

receiving, by the hub device from a second user device, second telemetry data associated with a second user during a second user session of the gaming application;

generating, by the hub device, a recommendation for a gaming interaction between the first user and the second user based on a comparison of the first telemetry data and the second telemetry data, wherein the recommendation is for a gaming assistance session for the first user;

transmitting, by the hub device, the recommendation for the gaming assistance session for the first user to a display device associated with at least one of the first user device or the second user device as part of an audio/visual (AV) output generated by the hub device, wherein the display device is a first display device in a first gaming environment associated with the first user session;

initiating, by the hub device, the gaming assistance session between the first and second users based on the recommendation, wherein the gaming assistance session is initiated on a second display device in a second gaming environment that is different than the first gaming environment, wherein the gaming assistance session is of the gaming application and comprises the first user and the second user; and migrating, by the hub device in response to initiating the gaming assistance session, session information associated with the first user session and the second user session to the gaming assistance session on the second display device in the second gaming environment.

2. The method of claim 1, wherein each of the first and second user devices is a wireless game controller associated with the respective first and second users.

3. The method of claim 1, wherein the recommendation is transmitted to the first user device, and wherein generating the recommendation comprises:

determining a first performance rating of the first user for a portion of the gaming application, based on the first telemetry data;

determining a second performance rating of the second user for the portion of the gaming application, based on the second telemetry data; and generating the recommendation for the gaming assistance session between the first user and the second user when the first performance rating of the first user is below a threshold performance rating and the second performance rating of the second user meets the threshold performance rating.

4. The method of claim 3, wherein the threshold performance rating is based on an average performance rating of other users with respect to the portion of the gaming application.

5. The method of claim 3, wherein the method further comprises:

displaying a prompt on the first display device, the prompt requesting confirmation that the first user agrees to receive gaming assistance from the second user for the portion of the gaming application;

receiving a response to the prompt from the first device of the first user; and initiating the gaming assistance session between the first and second users on the second display device in the second gaming environment when the response includes the requested confirmation.

6. The method of claim 3, wherein the second telemetry data includes session data and wellness data associated with the second user, and wherein determining the second performance rating comprises:

determining a skill level of the second user with respect to the portion of the gaming application, based on the session data;

determining an excitement level of the second user based on the wellness data; and determining the second performance rating based on the skill level and the excitement level of the second user, wherein the second performance rating meets the threshold performance rating when the skill level of the second user meets a threshold skill level and the excitement level of the second user meets a threshold excitement level.

7. The method of claim 1, further comprising:

determining, based on the first telemetry data and the second telemetry data, a first interaction event between the first user and the second user; and determining a relationship between the first and second users based on a model associated with at least one of the first user or the second user, wherein the recommendation is further generated based on the determined relationship.

8. The method of claim 7, further comprising:

receiving third telemetry data for a second interaction event between the first user and the second user after transmitting the recommendation to the first device; and updating the model based on the third telemetry data.

9. The method of claim 1, wherein the session information comprises a first character and user-specific settings of the first user from the first user session, and a second character and user-specific settings of the second user from the second user session, and wherein the migrating comprises:

migrating the first character and the user-specific settings of the first user to the gaming assistance session on the second display device in the second gaming environment; and migrating the second character and the user-specific settings of the second user to the gaming assistance session on the second display device in the second gaming environment.

10. An information handling system configured as a hub device, comprising:

a memory;

at least one processor coupled to the memory, wherein the at least one processor is configured to perform steps comprising:

receiving, by the hub device from a first user device, first telemetry data associated with a first user during a first user session of a gaming application;

receiving, by the hub device from a second user device, second telemetry data associated with a second user during a second user session of the gaming application;

generating, by the hub device, a recommendation for a gaming interaction between the first user and the second user based on a comparison of the first telemetry data and the second telemetry data, wherein the recommendation is for a gaming assistance session for the first user;

transmitting, by the hub device, the recommendation for the gaming assistance session for the first user to a display device associated with at least one of the first user device or the second user device as part of an audio/visual (AV) output generated by the hub device, wherein the display device is a first display device in a first gaming environment associated with the first user session;

initiating, by the hub device, the gaming assistance session between the first and second users based on the recommendation, wherein the gaming assistance session is initiated on a second display device in a second gaming environment that is different than the first gaming environment, wherein the gaming assistance session is of the gaming application and comprises the first user and the second user; and migrating, by the hub device in response to initiating the gaming assistance session, session information associated with the first user session and the second user session to the gaming assistance session on the second display device in the second gaming environment.

11. The information handling system of claim 10, wherein each of the first and second user devices is a wireless game controller associated with the respective first and second users.

12. The information handling system of claim 10, wherein the recommendation is transmitted to the first user device, and wherein generating the recommendation comprises:

determining a first performance rating of the first user for a portion of the gaming application, based on the first telemetry data;

determining a second performance rating of the second user for the portion of the gaming application, based on the second telemetry data; and generating the recommendation for the gaming assistance session between the first user and the second user when the first performance rating of the first user is below a threshold performance rating and the second performance rating of the second user meets the threshold performance rating.

13. The information handling system of claim 12, wherein the threshold performance rating is based on an average performance rating of other users with respect to the portion of the gaming application.

14. The information handling system of claim 12, wherein the steps further comprise:

displaying a prompt on the first display device, the prompt requesting confirmation that the first user agrees to receive gaming assistance from the second user for the portion of the gaming application;

receiving a response to the prompt from the first device of the first user; and initiating the gaming assistance session between the first and second users on the second display device in the second gaming environment when the response includes the requested confirmation.

15. The information handling system of claim 11, wherein the second telemetry data includes session data and wellness data associated with the second user, and wherein determining the second performance rating comprises:

determining a skill level of the second user with respect to the portion of the gaming application, based on the session data;

determining an excitement level of the second user based on the wellness data; and determining the second performance rating based on the skill level and the excitement level of the second user, wherein the second performance rating meets the threshold performance rating when the skill level of the second user meets a threshold skill level and the excitement level of the second user meets a threshold excitement level.

16. The information handling system of claim 10, wherein the at least one processor is further configured to perform operations comprising:

determining, based on the first telemetry data and the second telemetry data, a first interaction event between the first user and the second user; and determining a relationship between the first and second users based on a model associated with at least one of the first user or the second user, wherein the recommendation is further generated based on the determined relationship.

17. The information handling system of claim 16, wherein the at least one processor is further configured to perform operations comprising:

receiving third telemetry data for a second interaction event between the first user and the second user after transmitting the recommendation to the first device; and updating the model based on the third telemetry data.

18. A computer program product, comprising:

a non-transitory computer readable medium comprising code for performing steps comprising:

receiving, at a hub device from a first user device, first telemetry data associated with a first user during a first user session of a gaming application;

receiving, at the hub device from a second user device, second telemetry data associated with a second user during a second user session of the gaming application;

generating, by the hub device, a recommendation for a gaming interaction between the first user and the second user based on a comparison of the first telemetry data and the second telemetry data, wherein the recommendation is for a gaming assistance session for the first user; and transmitting, by the hub device, the recommendation for the gaming assistance session for the first user to a display device associated with at least one of the first user device or the second user device as part of an audio/visual (AV) output generated by the hub device, wherein the display device is a first display device in a first gaming environment associated with the first user session;

initiating, by the hub device, the gaming assistance session between the first and second users based on the recommendation, wherein the gaming assistance session is initiated on a second display device in a second gaming environment that is different than the first gaming environment, wherein the gaming assistance session is of the gaming application and comprises the first user and the second user; and migrating, by the hub device in response to initiating the gaming assistance session, session information associated with the first user session and the second user session to the gaming assistance session on the second display device in the second gaming environment.

19. The computer program product of claim 17, wherein each of the first and second user devices is a wireless game controller associated with the respective first and second users.

20. The computer program product of claim 18, wherein the recommendation is transmitted to the first user device, and wherein generating the recommendation comprises:

determining a first performance rating of the first user for a portion of the gaming application, based on the first telemetry data;

determining a second performance rating of the second user for the portion of the gaming application, based on the second telemetry data; and generating the recommendation for the gaming assistance session between the first user and the second user when the first performance rating of the first user is below a threshold performance rating and the second performance rating of the second user meets the threshold performance rating.

* * * * *